(12) United States Patent
Hotta et al.

(10) Patent No.: US 11,769,932 B2
(45) Date of Patent: Sep. 26, 2023

(54) ELECTRODE CONSTRUCT, ELECTRODE GROUP, SECONDARY BATTERY, BATTERY PACK, VEHICLE, AND STATIONARY POWER SUPPLY

(71) Applicant: KABUSHIKI KAISHA TOSHIBA, Tokyo (JP)

(72) Inventors: Yasuyuki Hotta, Tokyo (JP); Yumiko Sekiguchi, Kawasaki Kanagawa (JP); Shinsuke Matsuno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 17/187,714

(22) Filed: Feb. 26, 2021

(65) Prior Publication Data

US 2022/0085457 A1 Mar. 17, 2022

(30) Foreign Application Priority Data

Sep. 14, 2020 (JP) .................................. 2020-153684

(51) Int. Cl.
*H01M 50/46* (2021.01)
*H01M 10/0562* (2010.01)
(Continued)

(52) U.S. Cl.
CPC .......... *H01M 50/46* (2021.01); *H01M 4/502* (2013.01); *H01M 4/623* (2013.01); *H01M 4/661* (2013.01);
(Continued)

(58) Field of Classification Search
CPC ......... H01M 10/0525; H01M 10/4235; H01M 2004/021; H01M 2004/028;
(Continued)

(56) References Cited

U.S. PATENT DOCUMENTS

2009/0274832 A1* 11/2009 Inda .................. H01M 10/0436
2019/0089012 A1* 3/2019 Hotta .................... H01M 10/46
(Continued)

FOREIGN PATENT DOCUMENTS

JP 2018-92955 A 6/2018
JP 2019-121541 A 7/2019
(Continued)

*Primary Examiner* — Victoria H Lynch
(74) *Attorney, Agent, or Firm* — Finnegan, Henderson, Farabow, Garrett & Dunner, LLP

(57) ABSTRACT

According to one embodiment, an electrode construct including an electrode and a composite membrane is provided. The electrode includes an active material-containing layer and a current collecting layer. The active material-containing layer includes a first principal surface and a second principal surface. The current collecting layer is in contact with the second principal surface. The composite membrane includes a composite layer in contact with the first principal surface. The composite layer contains inorganic solid particles and a polymeric material. A peel strength σ1 at a first interface between the active material-containing layer and the composite layer and a peel strength σ2 at a second interface between the active material-containing layer and the current collecting layer satisfy a relationship of σ1>σ2, and σ2≤1 N/cm.

19 Claims, 9 Drawing Sheets

(51) Int. Cl.
*H01M 10/0525* (2010.01)
*H01M 4/50* (2010.01)
*H01M 4/62* (2006.01)
*H01M 4/66* (2006.01)
*H01M 50/403* (2021.01)
*H01M 4/02* (2006.01)

(52) U.S. Cl.
CPC ... *H01M 10/0525* (2013.01); *H01M 10/0562* (2013.01); *H01M 50/403* (2021.01); *H01M 2004/021* (2013.01); *H01M 2004/028* (2013.01); *H01M 2220/10* (2013.01); *H01M 2220/20* (2013.01); *H01M 2300/0071* (2013.01); *H01M 2300/0082* (2013.01)

(58) Field of Classification Search
CPC ......... H01M 2220/10; H01M 2220/20; H01M 2300/0071; H01M 2300/0082; H01M 4/502; H01M 4/623; H01M 4/661; H01M 50/403; H01M 50/417; H01M 50/4295; H01M 50/434; H01M 50/44; H01M 50/443; H01M 50/446; H01M 50/451; H01M 50/454; H01M 50/46; H01M 10/0562; H01M 10/058; Y02E 60/10

See application file for complete search history.

(56) References Cited

U.S. PATENT DOCUMENTS

| | | |
|---|---|---|
| 2019/0214621 A1 | 7/2019 | Hayashi |
| 2019/0305314 A1* | 10/2019 | Oyama ................ H01M 50/44 |
| 2021/0083251 A1 | 3/2021 | Hotta et al. |
| 2021/0091358 A1 | 3/2021 | Uno et al. |
| 2021/0091416 A1 | 3/2021 | Seki et al. |

FOREIGN PATENT DOCUMENTS

| | | |
|---|---|---|
| JP | 2021-44205 A | 3/2021 |
| JP | 2021-51990 A | 4/2021 |
| JP | 2021-51991 A | 4/2021 |

* cited by examiner

ELECTRODE CONSTRUCT, ELECTRODE GROUP, SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2020-153684, filed Sep. 14, 2020, the entire contents of which are incorporated herein by reference.

FIELD

Embodiments described herein relate generally to an electrode construct, an electrode group, a secondary battery, a battery pack, a vehicle, and a stationary power supply.

BACKGROUND

Nonaqueous electrolyte batteries such as lithium ion batteries are used as power sources in a wide range of fields. The forms of nonaqueous electrolyte batteries span over many, from small ones for various kinds of electronic devices and the like to large ones for electric vehicles and the like. The nonaqueous electrolyte batteries require safety measures since nonaqueous electrolytes containing flammable substances such as ethylene carbonate are used in the batteries.

Development of aqueous electrolyte batteries in which aqueous electrolytes containing nonflammable aqueous solvents are used instead of the nonaqueous electrolytes has been underway.

DETAILED DESCRIPTION

Figure 1:
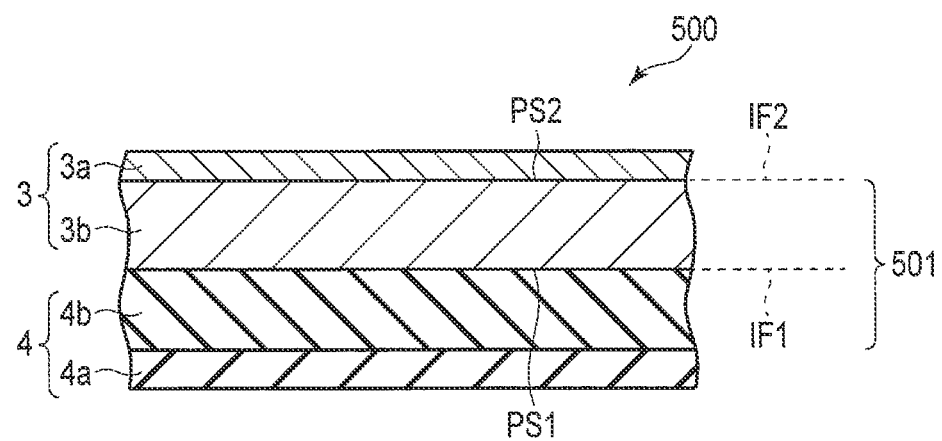
FIG. 1 is a cross-sectional view schematically showing an example of an electrode construct according to an embodiment.

According to one embodiment, provided is an electrode construct including an electrode and a composite membrane. The electrode includes an active material-containing layer and a current collecting layer. The active material-containing layer includes a first principal surface and a second principal surface on a reverse side to the first principal surface. The current collecting layer is in contact with the second principal surface of the active material-containing layer. The composite membrane includes a composite layer in contact with the first principal surface of the active material-containing layer. The composite layer contains inorganic solid particles and a polymeric material. A peel strength $\sigma 1$ at a first interface between the active material-containing layer and the composite layer, and a peel strength $\sigma 2$ at a second interface between the active material-containing layer and the current collecting layer satisfy a relationship of $\sigma 1 > \sigma 2$. The peel strength $\sigma 2$ satisfies $\sigma 2 \leq 1$ N/cm.

According to another embodiment, provided is an electrode group including the electrode construct according to the above embodiment, and a counter electrode to the electrode.

According to a further other embodiment, provided is a secondary battery including the electrode construct according to the above embodiment and an aqueous electrolyte. The aqueous electrolyte includes water.

According to yet another embodiment, provided is a battery pack including the secondary battery according to the above embodiment.

According to still another embodiment, provided is a vehicle including the battery pack according to the above embodiment.

According to another embodiment further in addition to the above, provided is a stationary power supply including the battery pack according to the above embodiment.

In general, the potential window of an aqueous electrolyte is narrower than the potential window of a nonaqueous electrolyte. Hence, in aqueous electrolyte batteries, water in the aqueous electrolyte may undergo electrolysis during the initial charge depending on the combination of the positive electrode and the negative electrode in some cases. Accordingly, separators used in aqueous electrolyte batteries are demanded to suppress the contact of water with the electrodes, that is, a denseness that exhibits high water shielding property is demanded.

In addition, in each of secondary batteries using lithium metal or zinc metal as an electrode and secondary batteries using an electrolyte containing lithium ions or zinc ions, there is concern that depositions such as lithium dendrites or zinc dendrites become generated on the electrodes upon charge and discharge. When these dendrites break through the separator, internal short circuits may occur. As well as from the viewpoint of being difficult to be broken through by the dendrites, the separator is demanded to be dense.

Examples of separators having particularly high denseness include solid electrolyte membranes. Solid electrolyte membranes are membranes formed only of solid electrolyte particles having ion conductivity. Solid electrolyte membranes can selectively allow only specific ions to pass through without allowing the solvent to pass through, and thus exhibit complete water shielding property. However, solid electrolyte membranes exhibit low flexibility, and thus are not sufficiently durable. Moreover, in order to use solid electrolyte membranes as a separator, solid electrolyte membranes are required to have a certain degree or more of thickness, making it difficult to increase the energy density of the battery.

In order to solve this problem, a polymer composite membrane in which solid electrolyte particles are bound to each other through a polymeric material has been proposed. The polymer composite membrane does not exhibit as complete a water shielding property as solid electrolyte membranes, but is highly dense and can be impregnated with a small amount of aqueous electrolyte. Moreover, the polymer composite membrane is superior to the solid electrolyte membrane in flexibility and can also be made thin.

However, even if the separator is formed to be highly dense so as to provide high water shielding property to the separator itself, a low adhesion between the separator and the electrode may result in occurrence of electrolysis of water. Specifically, if the separator easily comes off from the electrode, the separator may become crimpled or a space may be generated between the separator and the electrode, causing a large amount of water to be able to come into contact with the electrode. As a result, for example, safety may not be guaranteed due to hydrogen generated by electrolysis of water in the negative electrode, or self-discharge may advance due to the electrolysis reaction.

First Embodiment

According to a first embodiment, an electrode construct is provided. The electrode construct includes an electrode including an active material-containing layer and a current collecting layer, and a composite membrane including a composite layer in contact with a first principal surface of the active material-containing layer. The active material-containing layer includes the first principal surface and a second principal surface provided on a reverse side to the first principal surface. The current collecting layer is in contact with the second principal surface of the active material-containing layer. The composite membrane contains inorganic solid particles and a polymeric material. A peel strength $\sigma1$ at a first interface between the active material-containing layer and the composite layer, and a peel strength $\sigma2$ at a second interface between the active material-containing layer and the current collecting layer, satisfy a relationship of $\sigma1>\sigma2$. The peel strength $\sigma2$ at the second interface satisfies $\sigma2 \leq 1$ N/cm.

In the electrode construct of the above-described configuration, adhesion between the composite membrane functioning as a separator and the electrode is high, and the above-described crimpling of the separator and generation of the space are less likely to occur. Therefore, a secondary battery using this electrode construct has suppressed self-discharge. Further, such a secondary battery can exhibit a high charge-discharge efficiency.

In a secondary battery using, as a separator, a composite membrane (polymer composite membrane) containing inorganic solid particles and a polymeric material, a liquid electrolyte or a solvent of an electrolyte can infiltrate into minute gaps between the inorganic solid particles and the polymeric material, forming a lithium-ion ($Li^+$) conduction path. If an aqueous electrolyte is used, water in the electrolyte is bound to some extent, but can move within the composite membrane or seep outside the composite membrane. Therefore, if the adhesion at the interface between the composite membrane and the electrode is low, aqueous electrolyte-derived water may be accumulated at the interface. In such a case, a large number of water molecules, which serves as a reactant in an electrolysis reaction of water, is concentrated in this accumulation, whereby the progress of the electrolysis reaction to a product side including hydrogen is promoted. For example, water accumulated at the interface between the composite membrane and the negative electrode may result in generation of hydrogen.

The adhesion between the electrode and the composite membrane is high in the electrode construct, in which the peel strength $\sigma1$ at the first interface between the active material-containing layer and the composite layer and the peel strength $\sigma2$ at the second interface between the active material-containing layer and the current collecting layer satisfy the relationship of $\sigma1>\sigma2$, and the peel strength $\sigma2$ at the second interface is 1 N/cm or less. Therefore, the composite membrane is not apt to become crimpled. For this reason, in the secondary battery using this electrode construct, a large amount of liquid of an electrolyte (e.g., a liquid electrolyte, a solvent of an electrolyte, etc.) does not accumulate at the interface (first interface) between the active material-containing layer and the composite layer. If the electrode construct is used for a secondary battery containing an aqueous electrolyte, for example, it is possible to suppress self-discharge associated with electrolysis of an aqueous solvent at the negative electrode. In addition, while the volume change of the electrode associated with charging and discharging causes a stress at the interface between the active material-containing layer and the composite layer and the interface between the active material-containing layer and the current collecting layer, when $\sigma1>\sigma2$, the stress is released in priority at the interface between the active material-containing layer and the current collecting layer, and the interface structure between the active material-containing layer and the composite layer is maintained. The peel strength $\sigma1$ and the peel strength $\sigma2$ may satisfy the relationship of $\sigma1>1.5\times\sigma2$, and further satisfy the relationship of $\sigma1>10\times\sigma2$. That is, the peel strength $\sigma1$ may exceed 1.5 times the peel strength $\sigma2$, and the peel strength $\sigma1$ may further exceed 10 times the peel strength $\sigma2$.

The active material-containing layer and the composite layer are bound at the first interface. The peel strength $\sigma1$ at the first interface indicates the degree of binding between the active material-containing layer and the composite layer. That is, in the electrode construct, since the relationship of $\sigma1>\sigma2$ is satisfied, binding between the electrode and the composite membrane is stronger than that between the electrode and the current collector. When an electrode and a separator (not limited to a composite membrane) are merely stacked, a surface contact between the two at the interface therebetween is limited, whereby it is difficult to avoid formation of pool(s) of electrolyte liquid. In the electrode construct, since the electrode and the composite membrane are bound, no liquid accumulation is formed, and a region including a large amount of water can be reduced. Therefore, the contact between water in the electrolyte and the material contained in the electrode is reduced, thereby suppressing electrolysis of water.

The peel strength $\sigma2$ at the second interface between the active material-containing layer and the current collecting layer may be zero. Since the electrical connection is obtained through contact between the active material-containing layer and the current collecting layer, binding between these members is not required. For the material of the current collecting layer, as described below, metals such as zinc or aluminum subjected to surface treatment, alloys including aluminum, and the like may be used. The current collecting layer configured from such a material has sufficient hardness and does not easily become crimpled. Therefore, even when the peel strength $\sigma2$ is low, gaps at which water may be accumulated are not easily generated at the second interface. In particular, a foil-shaped current collecting layer has a small surface roughness, and is easily adhered to the second principal surface of the active material-containing layer.

It is desirable that the deviation of the peel strength σ1 at the first interface between the active material-containing layer and the composite layer be not large. Specifically, it is preferable that the peel strength σ1 exhibit diminishment of 100% or more, at 10% or less per 1 mm length along the first interface in the electrode construct. That is, it is preferable that for every 1 mm along the first interface, a portion where the peel strength σ1 deviates 100% or more to the negative direction take up 10% or less of the 1 mm length. In the electrode construct in which the deviation of the peel strength σ1 at the first interface is not large, the peel strength σ1 is maintained high along the first interface, and crimpling of the composite membrane or liquid accumulation is even less likely to occur.

The electrode included in the electrode construct includes an active material-containing layer and a current collecting layer. The electrode may be, for example, a negative electrode of a secondary battery. In this case, the active material-containing layer is a negative electrode active material-containing layer containing a negative electrode active material. The current collecting layer included in the electrode as the negative electrode may be referred to as a negative electrode current collector.

The active material-containing layer includes a first principal surface, and a second principal surface on a reverse side thereto. The first principal surface is in contact with the composite layer of the composite membrane. The second principal surface is in contact with the current collecting layer.

The active material-containing layer contains an active material (an electrode active material), optionally an electro-conductive agent, and a binder. The active material-containing layer desirably contains, as an active material, a first electrode active material including a compound having a lithium ion insertion-extraction potential of 1 V to 3 V (vs. Li/Li$^+$) relative to the oxidation-reduction potential of lithium.

In an aqueous electrolyte battery including as the negative electrode, an electrode containing a compound having a lithium ion insertion-extraction potential in the above range as the active material, water contained in the solvent of the aqueous electrolyte may undergo electrolysis inside the negative electrode and in the vicinity of the negative electrode at the time of the initial charge. This is because the potential of the negative electrode decreases as lithium ions are inserted into the negative electrode active material at the time of the initial charge. When the negative electrode potential decreases below the hydrogen generation potential, a part of water is decomposed into hydrogen ($H_2$) and hydroxide ions ($OH^-$) inside and in vicinity of the negative electrode. As a result, the pH of the aqueous electrolyte present inside and in vicinity of the negative electrode thus increases.

The hydrogen generation potential of the negative electrode depends on the pH of the aqueous electrolyte. In other words, the hydrogen generation potential of the negative electrode decreases when the pH of the aqueous electrolyte in contact with the negative electrode increases. In a battery using a negative electrode active material for which the lower limit value of the lithium ion insertion-extraction potential is 1 V or more (vs. Li/Li$^+$), the potential of the negative electrode is lower than the hydrogen generation potential at the time of the initial charge, but the potential of the negative electrode is likely to be higher than the hydrogen generation potential after the initial charge, and thus the decomposition of water in the negative electrode is less likely to occur.

As described above, in the electrode construct, accumulation of water is not easily formed at the first interface where the electrode surface on the separator side is located. This also means that water does easily infiltrate into the first interface from outside the electrode construct. Therefore, in the battery using the electrode construct as a composite member made up of the negative electrode and the separator, a pH of the aqueous electrolyte present in the negative electrode and in the vicinity of the negative electrode after the initial charge can be maintained at a high state. Accordingly, when a compound in which the lower limit value of the lithium ion insertion-extraction potential is 1 V or more (vs. Li/Li$^+$) is used as a first electrode active material (negative electrode active material) contained in the active material-containing layer of the electrode construct, it is possible to realize a secondary battery having a high capacity and excellent stability.

Examples of the compound having a lithium ion insertion-extraction potential of 1 V or more and 3 V or less (vs. Li/Li$^+$) relative to the oxidation-reduction potential of lithium include oxides of titanium and titanium-containing oxides. Examples of the titanium-containing oxide include lithium titanium composite oxide, niobium titanium composite oxide, and sodium niobium titanium composite oxide. The first electrode active material may include one or more of oxides of titanium and titanium-containing oxides.

Examples of the oxide of titanium include titanium oxide having a monoclinic structure, titanium oxide having a rutile structure, and titanium oxide having an anatase structure. For the titanium oxide having each of the crystal structures, the composition before charge can be represented as $TiO_2$ and the composition after charge can be represented as $Li_yTiO_2$ (subscript y is $0 \leq y \leq 1$). Further, for the titanium oxide having the monoclinic structure, the structure before charge can be represented as $TiO_2(B)$.

Examples of the lithium titanium oxide include a lithium titanium oxide having a spinel structure (e.g., a compound represented by $Li_{4+j}Ti_5O_{12}$ where $-1 \leq j \leq 3$), a lithium titanium oxide having a ramsdellite structure (e.g., a compound represented by $Li_{2+j}Ti_3O_7$ where $-1 \leq j \leq 3$), a compound represented by $Li_{1+y}Ti_2O_4$ where $0 \leq y \leq 1$, a compound represented by $Li_{1.1+y}Ti_{1.8}O_4$ where $0 \leq y \leq 1$, a compound represented by $Li_{1.07+y}Ti_{1.86}O_4$ where $0 \leq y \leq 1$, and a compound represented by $Li_kTiO_2$ where $0<k \leq 1$. The lithium titanium oxide may be a lithium-titanium composite oxide having a dopant introduced therein.

The niobium titanium composite oxides include, for example, a material represented by $Li_xTiMe_\alpha Nb_{2\pm\beta}O_{7\pm\sigma}$, where $0 \leq \chi \leq 5$, $0 \leq \alpha \leq 0.3$, $0 \leq \beta \leq 0.3$, $0 \leq \sigma \leq 0.3$, and Me is one or more selected from the group consisting of Fe, V, Mo, and Ta).

The sodium niobium titanium composite oxide includes, for example an orthorhombic Na-containing niobium titanium composite oxide represented by $Li_{2+d}Na_{2-e}Me1_fTi_{6-g-h}Nb_gMe2_hO_{14+\delta}$, where $0 \leq d \leq 4$, $0 \leq e<2$, $0 \leq f<2$, $0<g<6$, $0 \leq h<3$, $g+h<6$, and $-0.5 \leq \delta \leq 0.5$, Me1 includes one or more selected from the group consisting of Cs, K, Sr, Ba and Ca, and Me2 includes one or more selected from the group consisting of Zr, Sn, V, Ta, Mo, W, Fe, Co, Mn, and Al.

In a case where the electrode construct is used as a composite including a negative electrode, as the first electrode active material (the negative electrode active material), the titanium oxide of anatase structure, the titanium oxide of monoclinic structure, the lithium titanium oxide of spinel structure, the niobium titanium composite oxide, or a mixture thereof is preferably used. On one hand, when the titanium oxide of anatase structure, titanium oxide of monoclinic structure, or lithium titanium composite oxide of spinel structure is used as the negative electrode active material, by combining the electrode construct with, for example, a positive electrode using a lithium manganese composite oxide as a second electrode active material (positive electrode active material) as a counter electrode to the electrode included in the electrode construct, high electromotive force can be obtained. On the other hand, by using the niobium titanium composite oxide, high capacity can be attained.

The first electrode active material may be contained in the active material-containing layer, for example, in the form of particles. The first electrode active material particles may be primary particles, secondary particles which are agglomerates of the primary particles, or a mixture of single primary particles and secondary particles. The shape of the particles is not particularly limited, and may be, for example, a spherical shape, an elliptical shape, a flat shape, a fibrous shape, or the like.

The secondary particles of the first electrode active material can be obtained by, for example, the following method. First, the raw materials of the active material are reacted for synthesis to produce an active material precursor having an average particle size of 1 μm or less. After that, the active material precursor is subjected to a firing treatment, and a grinding treatment is performed using a grinder such as a ball mill or a jet mill. Next, in a firing treatment, the active material precursor is agglomerated to grow secondary particles with a larger particle size.

The average particle size (diameter) of the secondary particles of the first electrode active material is preferably 3 μm or more, and more preferably 5 μm to 20 μm. Within this range, since the surface area of the active material is small, decomposition of water can further be suppressed.

The average particle size of the primary particles of the first electrode active material is preferably 1 μm or less. This shortens the diffusion distance of Li ions within the active material and increases the specific surface area. For this reason, excellent high input performance (rapid charge) can be obtained. On the other hand, if the average particle size of the primary particles of the first electrode active material is small, agglomeration of the particles readily occurs. If agglomeration of the particles of the first electrode active material occurs, the aqueous electrolyte is readily unevenly distributed towards that electrode in the secondary battery, and the ionic species may be exhausted in the counter electrode. For this reason, the average particle size of the primary particles of the first electrode active material is preferably 0.001 μm or more. The average particle size of the primary particles of the first electrode active material is more preferably 0.1 μm to 0.8 μm.

Note that each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the active material particles with N-methyl-2-pyrrolidone such that the concentration becomes 0.1 mass % to 1 mass % is used. Alternatively, a measurement sample obtained by dispersing 0.1 g of active material in 1 ml to 2 ml of distilled water containing a surfactant is used.

The specific surface area of the first electrode active material in the BET method by nitrogen ($N_2$) adsorption falls within the range of, for example, 3 $m^2$/g to 200 $m^2$/g. If the specific surface area of the first electrode active material falls within this range, the affinity between the electrode and the aqueous electrolyte can be made higher. The specific surface area can be obtained by, for example, the same method as that to the later-described measurement method for the specific surface area of the active material-containing layer.

The porosity of the active material-containing layer is desirably 20% to 50%. This makes it possible to obtain an electrode having good affinity with respect to the aqueous electrolyte and also having a high density. The porosity of the active material-containing layer is more preferably 25% to 40%.

The porosity of the active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio between the total pore amount and the volume of the active material-containing layer.

The specific surface area of the active material-containing layer in terms of the BET method by nitrogen ($N_2$) adsorption is more preferably 3 $m^2$/g to 50 $m^2$/g. If the specific surface area of the active material-containing layer is less than 3 $m^2$/g, the affinity between the negative electrode active material and the aqueous electrolyte may decrease. As a result, the interfacial resistance of the electrode increases, and the output performance and the charge-discharge cycle performance may decrease. On the other hand, if the specific surface area of the active material-containing layer exceeds 50 $m^2$/g, ionic species ionized from the electrolyte salt included in the aqueous electrolyte may become unevenly distributed towards the electrode included in the electrode construct, invoking a shortage of the ionic species in the counter electrode. Hence, the output performance and the charge-discharge cycle performance may decrease.

The specific surface area can be obtained by, for example, the following method. In a case where the electrode construct including the active material-containing layer to be measured is assembled into a secondary battery, the secondary battery is disassembled, and a part of the active material-containing layer is extracted. Next, in nitrogen gas at 77 K (boiling point of nitrogen), while a nitrogen gas pressure P (mmHg) is gradually increased, the nitrogen gas adsorption amount (mL/g) of the sample is measured at each pressure P. Then, an adsorption isotherm is obtained by plotting the adsorption amount of nitrogen gas with respect to each relative pressure $P/P_0$, taking the value obtained by dividing the pressure P (mmHg) by a saturated vapor pressure $P_0$ (mmHg) of nitrogen gas as the relative pressure $P/P_0$. Then, a BET plot is calculated from the nitrogen adsorption isotherm and the BET equation, and a specific surface area is obtained using the BET plot. For the calculation of the BET plot, a BET multipoint method is used.

The electro-conductive agent is mixed-in as needed to raise current collection performance and suppress the contact resistance between the active material (first electrode active material) and the current collecting layer. Examples of the electro-conductive agent include carbonaceous materials such as acetylene black, Ketjen black, graphite, and coke. The electro-conductive agent may be of one species, or two or more species may be used in mixture.

The binder has a function of binding the active material (first electrode active material) and the electro-conductive agent. As the binder, at least one selected from the group consisting of, for example, polytetrafluoroethylene (PTFE), polyvinylidene fluoride (PVdF), a cellulose based polymer such as carboxymethyl cellulose (CMC), fluororubber, styrene butadiene rubber, an acrylic resin or a copolymer thereof, polyacrylic acid, and polyacrylonitrile may be used, though the binder is not limit to the above. For example, a polymeric material included in the composite layer of the composite membrane may be used as the binder. By using as the binder used for the active material-containing layer, the same material as the polymeric material used for the composite layer, the degree of binding between the two, namely, the peel strength σ1 can be improved. Details of the polymeric material for the composite layer will be described later. The binder may be of one species, or two or more species may be used in mixture.

The blending ratios of the first electrode active material, electro-conductive agent, and binder in the active material-containing layer are preferably 70% by mass to 95% by mass, 3% by mass to 20% by mass, and 2% by mass to 10% by mass, respectively. If the blending ratio of the electro-conductive agent is 3 mass % or more, the electrical conductivity of the active material-containing layer can be improved, and if the blending ratio is 20% by mass or less, decomposition of the aqueous electrolyte on the electro-conductive agent surface can be reduced. If the blending ratio of the binder is 2% by mass or more, a sufficient electrode strength can be obtained, and if the blending ratio is 10% by mass or less, insulating portions of the electrode can be diminished.

The current collecting layer is in contact with the second principal surface of the active material-containing layer. The current collecting layer may be in contact with the second principal surface of one active material-containing layer, or each of the second principal surfaces of two active material-containing layers. For example, the current collecting layer may be in contact with the second principal surface of one active material-containing layer at one principal surface and in contact with the second principal surface of another active material-containing layer at the other principal surface on the reverse side. That is, the electrode construct may include two active material-containing layers with one current collecting layer interposed therebetween. The two active material-containing layers may each be in contact with the composite layer of the composite membrane at the first principal surface. That is, the electrode construct may include two composite membranes each in contact with an active material-containing layer.

The current collecting layer may include, at at least a part thereof, a portion not in contact with the active material-containing layer at the principal surfaces on both the front and reverse sides of that part. This portion may serve as a current collecting tab. Alternatively, a current collecting tab separate from the current collecting layer may be electrically connected to the electrode. If the active material-containing layer is provided on each of the principal surfaces on both sides of the current collecting layer, the current collecting layer may include, on at least a part of one principal surface thereof, a portion not in contact with any active material-containing layer at that part. For example, a current collecting tab separate from the current collecting layer may be connected to this portion.

As the material for the current-collecting layer, used is a substance that is electrochemically stable within the electrode potential range for when alkali metal ions are inserted and extracted. The current-collecting layer is, for example, zinc foil, aluminum foil, or an aluminum alloy foil including one or more selected from the group consisting of magnesium (Mg), titanium (Ti), zinc (Zn), manganese (Mn), iron (Fe), copper (Cu), and silicon (Si). The current collecting layer is preferably such a foil whose surface is coated with a metal having high hydrogen overvoltage, such as Zn and Sn. The current collecting layer may have another form, such as a porous body or a mesh. The thickness of the current collecting layer is preferably 5 μm to 20 μm. A current collecting layer having such a thickness can maintain balance between the strength of the electrode and weight reduction.

The composite membrane includes a composite layer that is in contact with the first principal surface of the active material-containing layer. The composite layer contains inorganic solid particles and a polymeric material. In a secondary battery or an electrode group included in a secondary battery, the composite membrane serves as a separator electrically insulating the electrode included in the electrode construct from a counter electrode with respect to the electrode.

It is desirable that the composite membrane have high denseness and high water shielding property. In the electrode construct including the composite membrane having high denseness and water shielding property, a coefficient of air permeability of a conjugate of the composite membrane and the active material-containing layer may be $5 \times 10^{-15}$ m$^2$ or less. The coefficient of air permeability is preferably $1 \times 10^{-15}$ m$^2$ or less. There is no particular lower limit value of the coefficient of air permeability of the conjugate, but the lower limit value is $1 \times 10^{-19}$ m$^2$ or more according to an example. To be specific, the coefficient of air permeability may be within the range from $6.5 \times 10^{-19}$ m$^2$ to $5 \times 10^{-15}$ m$^2$. The method of calculating the coefficient of air permeability of the conjugate will be described later.

The composite membrane may include a substrate layer in addition to the composite layer. Of the composite layer in contact with the first principal surface of the active material-containing layer, the substrate layer may be provided on the surface on the reverse side with respect to the surface in contact with the first principal surface. The substrate layer is, for example, made of a porous material described later, and includes a greater number of voids than those in the composite layer. Therefore, the substrate layer can hold a greater amount of electrolyte as compared to the composite layer. That is, by including the substrate layer in contact with the composite layer in the composite membrane, and configuring the conjugate of the composite membrane and the active material-containing layer in which the active material-containing layer, the composite layer, and the substrate layer are disposed in this order, within the composite membrane, the amount of electrolyte held can be increased at the portion of the substrate layer which is away from the electrode, and the amount of electrolyte held can be reduced at the portion of the composite layer which is in contact with the electrode. Including the substrate layer in the composite membrane can enhance the ability of having electrolyte impregnated while maintaining the composite membrane to have high denseness.

The composite membrane may include the substrate layer, and one composite layer (first composite layer) provided on one principal surface of the substrate layer. Alternatively, the composite membrane may include the substrate layer, one composite layer (first composite layer) provided on one principal surface of the substrate layer, and another composite layer (second composite layer) provided on the other principal surface on the reverse side of the substrate layer. That is, the composite membrane may include one or two composite layers. In either case, at least one composite layer is in contact with the first principal surface of the active material-containing layer, and the composite layer in contact with the first principal surface may be referred to as a first composite layer, for the sake of convenience. For the composite membrane including two composite layers respectively provided on both surfaces of the substrate layer, the composite layer in contact with the first principal surface may be referred to as a first principal surface while the other composite layer may be referred to as a second composite layer, for the sake of convenience.

As inorganic solid particles contained in the composite layer, examples include oxide-based ceramics such as alumina, silica, zirconia, yttria, magnesium oxide, calcium oxide, barium oxide, strontium oxide, and vanadium oxide, carbonates and sulfates such as sodium carbonate, potassium carbonate, magnesium carbonate, calcium carbonate, barium carbonate, lanthanum carbonate, cerium carbonate, calcium sulfate, magnesium sulfate, aluminum sulfate, gypsum, and barium sulfate, phosphates such as hydroxyapatite, lithium phosphate, zirconium phosphate, and titanium phosphate, and nitride-based ceramics such as silicon nitride, titanium nitride, and boron nitride. The inorganic particles mentioned above may be in the form of a hydrate.

The inorganic solid particles preferably include solid electrolyte particles having ion conductivity of alkali metal ions. Specifically, inorganic solid electrolyte particles having ion conductivity with respect to lithium ions and sodium ions are more preferable.

Examples of the inorganic solid particles exhibiting lithium ion conductivity include an oxide-based solid electrolyte or a sulfide-based solid electrolyte. The oxide-based solid electrolyte is preferably a lithium phosphate solid electrolyte having a NASICON (Sodium (Na) Super Ionic Conductor) structure and which is represented by a general formula $Li_{1+x}M_2(PO_4)_3$. M in the above-described general formula is, for example, one or more selected from the group consisting of titanium (Ti), germanium (Ge), strontium (Sr), zirconium (Zr), tin (Sn), aluminum (Al), and calcium (Ca). The subscript x is within the range of $0 \leq x \leq 2$. The lithium phosphate solid electrolyte represented by the general formula $Li_{1+x}M_2(PO_4)_3$ has an ionic conductivity of, for example, $1 \times 10^{-5}$ S/cm to $1 \times 10^{-3}$ S/cm.

Specific examples of the lithium phosphate solid electrolyte having the NASICON structure include a LATP compound represented by $Li_{1+w}Al_wTi_{2-w}(PO_4)_3$ where $0.1 \leq w \leq 0.5$; a compound represented by $Li_{1+y}Al_zM1_{2-z}(PO_4)_3$ where M1 is one or more selected from the group consisting of Ti, Ge, Sr, Zr, Sn, and Ca, $0 \leq y \leq 1$, and $0 \leq z \leq 1$; a compound represented by $Li_{1+x}Al_xGe_{2-x}(PO_4)_3$ where $0 \leq x \leq 2$; a compound represented by $Li_{1+x}Al_xZr_{2-x}(PO_4)_3$ where $0 \leq x \leq 2$; a compound represented by $Li_{1+u+v}Al_u M\alpha_{2-u}Si_vP_{3-v}O_{12}$ where M$\alpha$ is one or more selected from the group consisting of Ti and Ge, $0 < u \leq 2$, and $0 \leq v < 3$; and a compound represented by $Li_{1+2t}Zr_{1-t}Ca_t(PO_4)_3$ where $0 \leq t < 1$. $Li_{1+2t}Zr_{1-t}Ca_t(PO_4)_3$ is preferably used as inorganic solid electrolyte particles because of its high water-resistance, low reducing ability, and low cost.

In addition to the above lithium phosphate solid electrolyte, examples of the oxide-base solid electrolyte include amorphous LIPON compounds represented by $Li_pPO_qN_r$ where $2.6 \leq p \leq 3.5$, $1.9 \leq q \leq 3.8$, and $0.1 \leq r \leq 1.3$ (e.g., $Li_{2.9}PO_{3.3}N_{0.46}$); a compound having a garnet structure represented by $La_{5+s}A_sLa_{3-s}M\beta_2O_{12}$ where A is one or more selected from the group consisting of Ca, Sr, and Ba, M$\beta$ is one or more selected from the group consisting of Nb and Ta, and $0 \leq s \leq 0.5$; a compound represented by $Li_3M\gamma_{2-s}L_2O_{12}$ where M$\gamma$ is one or more selected from the group consisting of Ta and Nb, and L may include Zr, and $0 \leq s \leq 0.5$; a compound represented by $Li_{7-3s}Al_sLa_3Zr_3O_{12}$ where $0 \leq s \leq 0.5$; and a LLZ compound represented by $Li_{5+s}La_3M2_{2-x}Zr_xO_{12}$ where M2 is one or more selected from the group consisting of Nb and Ta, and $0 \leq x \leq 2$ (e.g., $Li_7La_3Zr_2O_{12}$). One species of the solid electrolyte or a mixture of two or more species thereof may be used. LIPON has an ionic conductivity of, for example, $1 \times 10^{-6}$ S/cm to $5 \times 10^{-6}$ S/cm. LLZ has an ionic conductivity of, for example, $1 \times 10^{-4}$ S/cm to $5 \times 10^{-4}$ S/cm.

Further, as the solid electrolyte particles having ion conductivity of sodium ions, sodium-containing solid electrolytes may be used. The sodium-containing solid electrolytes are excellent in ion conductivity of sodium ions. Examples of the sodium-containing solid electrolyte include β-alumina, sodium phosphate sulfides, sodium phosphates, and the like. The sodium ion-containing solid electrolyte is preferably in the form of glass-ceramic.

The inorganic solid particles are preferably a solid electrolyte having a lithium ion conductivity of $1 \times 10^{-5}$ S/cm or more at 25° C. The lithium ion conductivity can be measured by, for example, the alternating-current impedance method. Details will be explained later.

Shapes of the inorganic solid particles are not particularly limited, but may be, for example, spherical, elliptical, flat, fibrous, or the like.

The average particle size of the inorganic solid particles is preferably 15 µm or less, and is more preferably 12 µm or less. When the inorganic solid particles have a small average particle size, the denseness of the composite layer can be made high.

The average particle size of the inorganic solid particles is preferably 0.01 µm or more, and is more preferably 0.1 µm or more. When the inorganic solid particles have a large average particle size, aggregation of the particles tends to be suppressed.

The average particle size of the inorganic solid particles refers to a particle size at which a cumulative volume is 50% in a particle-size distribution obtained by a laser diffraction particle size analyzer. As a sample for this particle size analysis, a dispersion solution having the inorganic solid particles diluted with ethanol in a concentration of 0.01% by mass to 5% by mass is used.

In the case where the first composite layer and the second composite layer are respectively disposed on each of the principal surfaces on both of reverse sides of the substrate layer, the inorganic solid particles included in each of the composite layers may be the same, or those of different species may be used. Further, in the composite layer(s), a single species of inorganic solid particles may be used or plural species of inorganic solid particles may be used in mixture.

In the composite layer, the inorganic solid particles are preferably the main component. The proportion of the inorganic solid particles in the composite layer is preferably 70% by mass or more, more preferably 80% by mass or more, and still more preferably 85% by mass or more from the viewpoint of enhancing the ion conductivity of the composite layer. The proportion of the inorganic solid particles in the composite layer is preferably 98% by mass or less, more preferably 95% by mass or less, and still more preferably 90% by mass or less from the viewpoint of increasing the membrane strength of the composite layer. The proportion of the inorganic solid particles in the composite layer can be calculated by thermogravimetric (TG) analysis.

The polymeric material contained in the composite layer enhances the binding between the inorganic solid particles. The weight-average molecular weight of the polymeric material is, for example, 3,000 or more. When the weight-average molecular weight of the polymeric material is 3,000 or more, the binding of the inorganic solid particles can be further enhanced. The weight-average molecular weight of the polymeric material is preferably 3,000 to 5,000,000, more preferably 5,000 to 2,000,000, and further preferably 10,000 to 1,000,000. The weight-average molecular weight of the polymeric material can be obtained by gel permeation chromatography (GPC).

The polymeric material may be a polymer made of a single monomer unit, a copolymer made of plural monomer units, or a mixture thereof. The polymeric material preferably contains a monomer unit constituted by a hydrocarbon having a functional group including one or more selected from the group consisting of oxygen (O), sulfur (S), nitrogen (N), and fluorine (F). In the polymeric material, the proportion of a portion formed from the monomer unit is preferably 70 mol % or more. Such a monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

When the proportion occupied by the portion formed of the first monomer unit in the polymeric material is lower than 70 mol %, there is concern that the water shielding properties of the first and second composite layers decrease. The proportion of the portion formed from the first monomer unit in the polymeric material is preferably 90 mol % or more. Most preferably, the proportion of the portion formed from the first monomer unit in the polymeric material is preferably 100 mol %, that is, the polymeric material is most preferably a polymer formed from only the first monomer unit.

The first monomer unit may be a compound whose side chain has a functional group including one or more selected from the group consisting of oxygen (O), sulfur (S), nitrogen (N), and fluorine (F) and whose main chain is formed from carbon-carbon bonds. The hydrocarbon may have one or more functional groups each including one or more elements selected from the group consisting of oxygen (O), sulfur (S), nitrogen (N), and fluorine (F). The functional group in the first monomer unit enhances the conductivity of alkali metal ions passing through the composite layer.

The hydrocarbon that forms the first monomer unit preferably has a functional group including one or more selected from the group consisting of oxygen (O), sulfur (S), and nitrogen (N). When the first monomer unit has such a functional group, the conductivity of alkali metal ions in the composite layer tends to be further enhanced and the internal resistance tends to decrease.

The functional group contained in the first monomer unit preferably includes one or more selected from the group consisting of a formal group, a butyral group, a carboxymethyl ester group, an acetyl group, a carbonyl group, a hydroxyl group, and a fluoro group. In addition, the first monomer unit preferably contains at least one of a carbonyl group and a hydroxyl group in the functional group, and more preferably contains both.

The first monomer unit can be represented by the following formula.

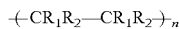

In the formula, $R_1$ is preferably selected from the group consisting of hydrogen (H), an alkyl group, and an amino group. In addition, $R_2$ is preferably selected from the group consisting of a hydroxyl group (—OH), —OR$_1$, —COOR$_1$, —OCOR$_1$, —OCH(R$_1$)O—, —CN, —N(R$_1$)$_3$, and —SO$_2$R$_1$.

Examples of the first monomer unit include one or more selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, polyvinylidene fluoride, and tetrafluoroethylene.

The polymeric material preferably contains one or more selected from the group consisting of polyvinyl formal, polyvinyl alcohol, polyvinyl acetal, polyvinyl butyral, polymethyl methacrylate, polyvinylidene fluoride, and polytetrafluoroethylene.

Examples of structural formulas of compounds usable as the polymeric material will be described below.

The structural formula of polyvinyl formal is as follows. In the formula, preferably, a is 50 to 80, b is 0 to 5, and c is 15 to 50.

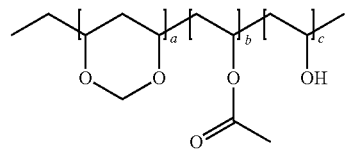

The structural formula of polyvinyl butyral is as follows. In the formula, preferably, 1 is 50 to 80, m is 0 to 10, and n is 10 to 50.

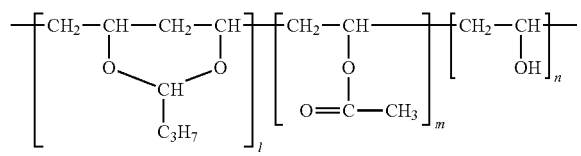

The structural formula of polyvinyl alcohol is as follows. In the formula, preferably, n is 70 to 20,000.

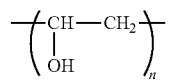

The structural formula of polymethyl methacrylate is as follows. In the formula, preferably, n is 30 to 10,000.

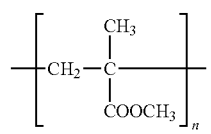

The second monomer unit is a compound other than the first monomer unit, that is, a compound that does not have a functional group including one or more selected from the group consisting of oxygen (O), sulfur (S), nitrogen (N), and fluorine (F), or a compound that has the functional group but is not a hydrocarbon. Examples of the second monomer unit include ethylene oxide and styrene. Examples of a polymer formed from the second monomer unit include polyethylene oxide (PEO) and polystyrene (PS).

The species of the functional groups included in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the proportion occupied by the portion formed from the first monomer unit can be calculated by NMR.

The polymeric material may contain an aqueous electrolyte. The proportion of the aqueous electrolyte that the polymeric material may contain can be grasped based on a water absorption capacity thereof. Here, the water absorption capacity of the polymeric material is given by a value ($[M_p'-M_p]/M_p \times 100$), where the polymeric material is immersed in water at a temperature of 23° C. for 24 hours, and a value obtained by subtracting a mass $M_p$ of the polymeric material before immersion from a mass $M_p'$ of the polymeric material after immersion is divided by the mass $M_p$ of the polymeric material before immersion. The water absorption capacity of the polymeric material is considered to be associated with the polarity of the polymeric material.

When a polymeric material having a high water absorption capacity is used, the alkali metal ion conductivity of the composite layer tends to be higher. In addition, when a polymeric material having a high water absorption capacity is used, the binding force between the inorganic solid particles and the polymeric material increases and the flexibility of the composite layer can be enhanced. The water absorption capacity of the polymeric material is preferably 0.01% or more, more preferably 0.5% or more, and further preferably 2% or more.

When a polymeric material having a low water absorption capacity is used, the strength of the composite layer can be enhanced. In other words, when the water absorption capacity of the polymeric material is too high, the composite layer may swell due to the aqueous electrolyte, in some cases. In addition, when the water absorption capacity of the polymeric material is too high, the polymeric material in the composite layer may flow out into the aqueous electrolyte. The water absorption capacity of the polymeric material is preferably 15% or less, more preferably 10% or less, further preferably 7% or less, and particularly preferably 3% or less.

The proportion of the polymeric material in the composite layer is preferably 1% by mass or more, more preferably 3% by mass or more, and still more preferably 10% by mass or more from the viewpoint of enhancing the flexibility of the composite layer. In addition, the denseness of the composite oxide tends to be higher when the proportion of the polymeric material is greater.

In addition, the proportion of the polymeric material in the composite membrane is preferably 20% by mass or less, more preferably 10% by mass or less, and still more preferably 5% by mass or less from the viewpoint of enhancing the lithium ion conductivity of the composite layer. The proportion of the polymeric material in the composite membrane can be calculated by thermogravimetric (TG) analysis.

In the case the first composite layer and the second composite layer are included, the polymeric materials included in each composite layer may be the same, or those of different species may be used. In addition, as the polymeric material(s), a single species of polymeric material may be used or plural species of polymeric materials may be used in mixture.

The composite layer may contain a plasticizer and an electrolyte salt in addition to the inorganic solid particles and the polymeric material. For example, when the composite layer contains an electrolyte salt, the alkali metal ion conductivity of the composite membrane can be further enhanced.

The thickness of the composite layer is preferably 3 µm or greater, more preferably 5 µm or greater, and further preferably 7 µm or greater, from the viewpoint that short-circuiting is not likely to occur. In addition, the thickness of the composite layer is preferably 50 µm or less, more preferably 30 µm or less, and further preferably 20 µm or less, from the viewpoint of enhancing the ion conductivity and energy density.

In the case where the first composite layer and the second composite layer are respectively provided on both the front and reverse principal surfaces of the substrate layer, the thicknesses of the composite layers may be the same or different from each other. If the thickness differs, it is preferable that the first composite layer in contact with the first principal surface of the active material-containing layer be thicker than the other second composite layer. When the first composite layer is thicker, the water shielding property can be enhanced. Further, the composite layers respectively provided on both the front and reverse surfaces of the substrate layer may have the same or different configuration.

The substrate layer may support the composite layer (first composite layer) on one principal surface thereof. Alternatively, the substrate layer may respectively support the first composite layer and the second composite layer on both principal surfaces thereof.

The substrate layer is, for example, a nonwoven fabric or a self-supporting porous film. As materials for the nonwoven fabric or the self-supporting porous film, for example, polyethylene (PE), polypropylene (PP), cellulose, or polyvinylidene fluoride (PVdF) is used. The substrate layer is preferably a nonwoven fabric formed of cellulose.

The substrate layer can include many voids and can be impregnated with a large amount of electrolyte. The substrate layer typically does not contain inorganic solid particles. For example, the proportion of the area of the inorganic solid particles in the cross section of the substrate layer may be 5% or less.

The thickness of the substrate layer is, for example, 1 µm or more and preferably 3 µm or more. When the substrate layer is thick, the mechanical strength of the separator increases and the internal short circuit of the secondary battery is less likely to occur. The thickness of the substrate layer is, for example, 30 µm or less and preferably 10 µm or less. When the substrate layer is thin, the internal resistance of the secondary battery tends to decrease and the volume energy density of the secondary battery tends to increase. The thickness of the substrate layer can be measured using, for example, a scanning electron microscope.

As described above, the composite membrane may include the aqueous electrolyte in the composite layer and the substrate layer. The active material-containing layer may also include the aqueous electrolyte. That is, the electrode construct may include a first aqueous electrolyte in the active material-containing layer, and a second aqueous electrolyte in the composite membrane. The first aqueous electrolyte and the second aqueous electrolyte may have the same composition or different compositions. In the following description, unless specified, the first aqueous electrolyte and the second aqueous electrolyte are simply referred to as "aqueous electrolyte" collectively.

The aqueous electrolyte contains an aqueous solvent and an electrolyte salt. The aqueous electrolyte may be liquid. A liquid aqueous electrolyte is prepared by dissolving the electrolyte salt serving as a solute in the aqueous solvent.

As the electrolyte salt, for example, a lithium salt, a sodium salt, or a mixture thereof is used. One species or two or more species of electrolyte salts may be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI; $LiN(SO_2CF_3)_2$), lithium bis(fluorosulfonyl)imide (LiFSI; $LiN(SO_2F)_2$), lithium bis(oxalate)borate (LiBOB; $LiB[(OCO)_2]_2$), or the like may be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like may be used.

As the lithium salt, LiCl is preferably included. When LiCl is used, the lithium ion concentration of the aqueous electrolyte can be made high. Additionally, the lithium salt preferably includes at least one of $LiSO_4$ and LiOH in addition to LiCl.

In addition, other than the lithium salt, zinc salts such as zinc chloride and zinc sulfate may be added to the electrolytic solution, too. By adding such a compound to the electrolytic solution, in a battery using the electrode included in the electrode construct as a negative electrode, a zinc-containing coating layer and/or an oxidized zinc-containing region may be formed in the electrode. Such members including zinc exhibit the effect of suppressing hydrogen generation in the electrode where the members are formed.

The mol concentration of lithium ions in the aqueous electrolyte is preferably 3 mol/L or more, more preferably 6 mol/L or more, and much more preferably 12 mol/L or more. When the concentration of the lithium ions in the aqueous electrolyte is high, electrolysis of the aqueous solvent in the electrode can easily be suppressed, and hydrogen generation from the electrode tends to be little.

In the aqueous electrolyte, the aqueous solvent amount is preferably 1 mol or more relative to 1 mol of the salt serving as solute. In a more preferable form, the aqueous solvent amount relative to 1 mol of the salt serving as solute is 3.5 mol or more.

The aqueous electrolyte preferably contains, as an anion species, at least one anion species selected from the group consisting of a chloride ion ($Cl^-$), a hydroxide ion ($OH^-$), a sulfate ion ($SO_4^{2-}$), and a nitrate ion ($NO_3^-$).

The pH of the aqueous electrolyte is preferably 3 to 14, and more preferably 4 to 13. In any embodiment, the pH is a value measured at 25±2° C.

As the aqueous solvent, a solution containing water may be used. Here, the solution containing water may be pure water or a solvent mixture of water and an organic solvent.

The aqueous electrolyte may be a gel electrolyte. The gel electrolyte is prepared by mixing the above-described liquid aqueous electrolyte and a polymeric compound to obtain a composite. As the polymeric compound, for example, polyvinylidene fluoride (PVdF), polyacrylonitrile (PAN), polyethylene oxide (PEO), and the like may be used.

Whether the aqueous electrolyte contains water can be examined by GC-MS (Gas Chromatography-Mass Spectrometry). In addition, the salt concentration and water content in the aqueous electrolyte can be measured by, for example, ICP (Inductively Coupled Plasma) emission spectrometry. A predetermined amount of aqueous electrolyte is measured, and the concentration of the contained salt is calculated, thereby calculating the mol concentration (mol/L). In addition, when the specific gravity of the aqueous electrolyte is measured, the number of moles of the solute and of the solvent can be calculated.

FIG. 1 shows an example of the above-described electrode construct. FIG. 1 is a cross-sectional view schematically illustrating an example of the electrode construct according to the embodiment. The example of FIG. 1 includes a negative electrode as the electrode. Such an electrode construct may be called a negative electrode construct.

An electrode construct 500 includes a negative electrode 3 and a composite membrane 4. The negative electrode 3 includes a negative electrode active material-containing layer 3b and a negative electrode current collecting layer 3a. The composite membrane 4 includes a substrate layer 4a and a composite layer 4b. The composite layer 4b is in contact with a first principal surface PS1 of the negative electrode active material-containing layer 3b. The negative electrode current collecting layer 3a is in contact with a second principal surface PS2 that is a principal surface on a reverse side of the first principal surface PS1 of the negative electrode active material-containing layer 3b. The electrode construct 500 further includes an aqueous electrolyte (not shown). The aqueous electrolyte is held in a conjugate 501 of the negative electrode active material-containing layer 3b and the composite layer 4b. The aqueous electrolyte may also be held in the substrate layer 4a.

Peel strength σ1 at a first interface IF1 between the negative electrode active material-containing layer 3b and the composite layer 4b is greater than peel strength σ2 at a second interface IF2 between the negative electrode active material-containing layer 3b and the negative electrode current collecting layer 3a. The peel strength σ2 at the second interface IF2 is 1 N/cm or less.

In the illustrated example, the composite layer 4b is provided on one principal surface of the substrate layer 4a, but the substrate layer 4a may be omitted. Alternatively, the composite layer 4b may also be provided on another principal surface of the substrate layer 4a, so as to use the composite membrane 4 including the composite layers 4b supported on both surfaces of the substrate layer 4a.

<Production Method>

Next, a method of producing the electrode construct according to the embodiment will be described. In summary, the method of producing the electrode construct includes: preparing a composite membrane including a composite layer; forming an active material-containing layer by application of an electrode mixture slurry onto a surface of the composite layer to obtain a conjugate of the composite membrane and the active material-containing layer; impregnating an aqueous electrolyte into the conjugate; and providing a current collecting layer on the active material-containing layer.

The composite membrane including the composite layer is prepared, for example, as follows.

A slurry for forming the composite layer is prepared. The slurry for composite layer formation is obtained by stirring a mixture obtained by mixing inorganic solid particles, a polymeric material, and a solvent.

As the solvent, a solvent capable of dissolving a polymeric material is preferably used. Examples of the solvent include alcohols such as ethanol, methanol, isopropyl alcohol, normal propyl alcohol and benzyl alcohol; ketones such as acetone, methyl ethyl ketone, methyl isobutyl ketone, cyclohexanone and diacetone alcohol; esters such as ethyl acetate, methyl acetate, butyl acetate, ethyl lactate, methyl lactate and butyl lactate; ethers such as methyl Cellosolve, ethyl Cellosolve, butyl Cellosolve, 1,4-dioxane and tetrahydrofuran; glycols such as ethylene glycol monoethyl ether acetate, propylene glycol monomethyl ether acetate, butyl carbitol acetate, and ethyl carbitol acetate; glycol ethers such as methyl carbitol, ethyl carbitol, and butyl carbitol; aprotic polar solvents such as dimethylformamide, dimethylacetamide, acetonitrile, valeronitrile, N-methyl-2-pyrrolidone, N-ethyl-2-pyrrolidone and γ-butyrolactam; cyclic carboxylate esters such as gamma-butyrolactone, gamma-valerolactone, gamma-caprolactone and epsilon-caprolactone; and linear carbonate compounds such as dimethyl carbonate, diethyl carbonate, di-n-propyl carbonate, diisopropyl carbonate, n-propyl isopropyl carbonate, ethyl methyl carbonate, and methyl n-propyl carbonate.

The slurry for composite layer formation is applied onto, for example, one principal surface of a substrate layer such as a cellulose-based nonwoven fabric by, for example, a doctor blade method to obtain a coating film. Alternatively, the slurry for composite layer formation is applied onto principal surfaces on both of reverse surfaces of the substrate layer, to obtain a coating film on each principal surface. The slurries for composite layer formation applied onto each of the principal surfaces may have the same composition, or compositions that are different with respect of each other. The coating film(s) is dried at a temperature of 50° C. or more and 150° C. or less. In this manner, obtained is a stack where the dried coating film(s) is formed on one face or both faces of the substrate layer.

Next, this stack is subjected to a roll-press treatment. Upon the roll-press treatment, for example, a press apparatus equipped with two rollers on upper and lower portions is used. By using such a press apparatus, in the case that coating films are disposed on both faces of the substrate layer, both coating films can simultaneously be subjected to pressing. At this time, the heating temperature of the roller can be appropriately varied depending on the desired structure. For instance, the heating temperature of the roller is set to a temperature within ±20° C. of the softening point of the polymeric material in the coating film. By subjecting the coating film to the roll-press treatment at a temperature close to the softening point of the polymeric material, only the polymeric material located on the surface side of the coating film is heated and softened. In addition, due to the coating film being pressurized, the polymeric material located on the substrate layer side of the coating film may become extruded to the surface side. Hence, the softened polymeric material is disposed so as to fill gaps between the inorganic solid particles on the surface side of the coating film, whereby the denseness is enhanced as compared with that on the inner side of the coating film. In this manner, a first composite layer of which the denseness on the surface side is different from that on the inner side (substrate side) can be obtained. In contrast, by performing the roll-press treatment on the coating film at 25° C. room temperature, there can be obtained composite layer(s) whose denseness is uniform along a thickness direction of the coating film. The heating temperature of the roller is preferably lower than the melting point of the polymeric material. When the heating temperature is increased to the melting point of the polymeric material or higher, the polymeric material may melt on the surface side of the coating film, whereby the voids may be completely lost. Complete loss of the voids is undesirably since the ion conductivity of the composite layer diminishes.

The softening point and melting point of the polymeric material may vary depending on the molecular weight and the unit ratio of monomer. According to an example, the softening point of PVdF is 135° C. to 145° C. and the melting point thereof is 170° C. to 180° C. The softening point of polyvinyl formal is 120° C. to 130° C. and the melting point thereof is 190° C. to 200° C. The softening point of polyvinyl butyral is 120° C. to 130° C. and the melting point thereof is 190° C. to 200° C.

Alternatively, a composite layer of which the denseness on the surface side is different from that on the inner side may be provided by applying two kinds of slurries so as to form a two-layer structure. In other words, for example, a slurry having a high proportion of inorganic solid particles and a low proportion of polymeric material is prepared as a slurry for forming a lower layer, which is located on the substrate layer side of the composite layer and exhibits low denseness. This slurry for lower layer formation is applied on one principal surface of the substrate layer and dried to obtain a coating film. Next, for example, a slurry having a low proportion of inorganic solid particles and a high proportion of polymeric material is prepared as a slurry for forming an upper layer, which is located on the surface side of the composite layer and exhibits high denseness. This slurry for upper layer formation is applied onto the coating film on the one principal surface of the substrate layer and dried to further provide a coating film. In this manner, a composite layer of which the denseness on the surface side is different from that on the inner side can be obtained regardless of the heating temperature of the roller.

In the manner described above, a composite membrane including a substrate layer and a composite layer may be obtained. Note that the above-described press apparatus allows the coating films provided on both surfaces of the substrate layer to be simultaneously subjected to a roll press treatment, but the coating films may be subjected to the roll press treatment one by one. Even in a case where the coating films are provided on both surfaces of the substrate layer as well, the above-described press apparatus equipped with two rollers on upper and lower portions can be used.

By pressing the slurry for composite layer formation in a state where members other than the constituent members of the composite membrane (composite layer and/or substrate layer) are not included, a composite membrane exhibiting a low coefficient of air permeability, i.e., high denseness and high water shielding property, can be obtained. Accordingly, with this composite membrane, it is possible to obtain a conjugate of active material-containing layer and composite membrane having a low coefficient of air permeability. In roll pressing in combination with other members such as an active material-containing layer, increasing the denseness of the composite layer is limited, and decreasing the coefficient of air permeability is limited. For example, in a conjugate obtained by applying a slurry for composite layer formation on an active material-containing layer and drying and pressing a coating film, it is difficult to reduce a coefficient of air permeability to a certain level or less.

In the above-described example, the production method using the substrate layer has been described, but a self-supporting composite layer may be formed as a composite membrane without using a substrate layer. When the substrate layer is used, the composite layer can be formed more easily.

Next, an active material-containing layer is formed by application of an electrode mixture slurry onto a surface of the composite layer to obtain a conjugate of the composite membrane and the active material-containing layer.

An active material, electro-conductive agent, and binder are suspended in an appropriate solvent to prepare an electrode mixture slurry. The slurry is applied onto the composite layer. Here, if a self-supporting composite layer is formed as a composite membrane, the electrode mixture slurry is applied onto one principal surface of the composite layer (composite membrane). If the composite membrane has the composite layer on only one surface of the substrate layer, the electrode mixture slurry is applied onto this composite layer. If the composite membrane has the composite layers on both surfaces of the substrate layer, the electrode mixture slurry is applied onto the composite layer on one face of the composite membrane. The coating film on the composite layer is dried to form a coating film of an electrode mixture. The composite membrane and the coating film of the electrode mixture formed on the composite layer are subjected to pressing to form an active material-containing layer. In this manner, a conjugate of the composite membrane and the active material-containing layer bound to the composite layer is obtained.

Here, depending on the application speed of the electrode mixture slurry and the thickness of the coating film of the electrode mixture, the peel strength $\sigma 1$ at the first interface between the composite layer and the active material-containing layer may vary. For example, lowering the application speed may increase the peel strength $\sigma 1$. Further, the peel strength $\sigma 1$ may vary depending on the drying temperature of the electrode mixture slurry.

An aqueous electrolyte is impregnated into the conjugate of the composite membrane and the active material-containing layer thus obtained. For example, by immersing the conjugate into the liquid aqueous electrolyte prepared according to the above-described method and allowing it to stand under reduced pressure for 0.1 hour or more, the aqueous electrolyte can be preliminarily impregnated into the active material-containing layer and the composite membrane. The upper limit of the time of immersing the conjugate in the liquid aqueous electrolyte under reduced pressure may be any, but 24 hours or less is preferable from practical perspective. By impregnating the aqueous electrolyte into the conjugate before the current collecting layer is provided, the aqueous electrolyte in an amount sufficient to operate a secondary battery using the electrode construct can be made to be held in the active material-containing layer and the composite membrane. It is difficult to impregnate a sufficient amount of aqueous electrolyte in the active material-containing layer and the composite membrane after the current collecting layer is provided.

Subsequently, the current collecting layer is provided on the active material-containing layer. The current collecting layer made of the above-described material is placed on the active material-containing layer. A stack of the current collecting layer and the conjugate including the composite membrane and the active material-containing layer thus obtained may be subjected to a press treatment. Alternatively, the press treatment may be omitted. Whether a press treatment is performed and a pressing pressure affect the peel strength $\sigma 2$ at the second interface between the active material-containing layer and the current collecting layer. At this time, as a matter of course, the peel strength $\sigma 2$ becomes greater when the press treatment is performed than when the press treatment is omitted. Further, when the pressing pressure is higher, the peel strength $\sigma 2$ tends to be greater.

Two conjugates each formed of the composite membrane and the active material-containing layer may be prepared, and after impregnating the aqueous electrolyte into each conjugate, one current collecting layer may be sandwiched between the conjugates. At this time, the principal surfaces (second principal surfaces) of the active material-containing layers of both of the conjugates are disposed to be respectively in contact with the principal surfaces on both the front and back sides of the current collecting layer. The press treatment may be applied to the stack obtained, or may be omitted. The current collecting layer may be provided on the active material-containing layer of one conjugate and subjected to press treatment, and then another conjugate may be overlaid on the current collecting layer. After the second conjugate is overlaid, the press treatment may be performed again, or the second press treatment may be omitted.

By the above-described procedure, the electrode construct according to the embodiment can be obtained.

<Measurement Method>

Various measurement methods will be described. When an electrode construct to be measured is incorporated inside a secondary battery, the secondary battery is placed in a discharged state and then disassembled to take out the electrode construct. Specifically, an electrode group is taken out from the battery, and a counter electrode with respect to the electrode included in the electrode construct is separated from the electrode group, thereby obtaining an electrode construct. For example, by separating a positive electrode from an electrode group, an electrode construct including an electrode used as a negative electrode can be obtained. For example, in an electrode group, an electrode that can be more easily separated from a member functioning as a separator such as a composite membrane is deemed as a counter electrode with respect to the electrode included in the electrode construct.

(Measurement Method of Peel Strengths $\sigma 1$ and $\sigma 2$)

In the electrode construct, the peel strength $\sigma 1$ at the first interface and the peel strength $\sigma 2$ at the second interface can be measured by the surface/interface cutting method. Before measurement, both surfaces of the electrode construct is washed with pure water, and then the electrode construct is immersed in pure water and left to stand for 48 hours or more. Thereafter, both surfaces are further washed with pure water and dried in a vacuum drying furnace at 100° C. for 48 hours or more, thereby preparing a measurement sample of the electrode construct.

The measurement of the peeling strength according to the surface/interface cutting method may be performed by using a cutting strength measurement device such as a surface and interfacial cutting analysis system (SAICAS) (registered trademark). The surface/interface cutting method may also be referred to as the SAICAS method. As a measurement device, for example, DN-GS from DAYPLA WINTES CO., LTD., may be used. As a cutting knife, for example, a ceramic knife made of borazon and having a knife width of 1.0 mm is used. As measurement conditions, for example, a knife angle has a rake angle of 20 degrees and a clearance angle of 10 degrees.

In the measurement of the peel strength $\sigma 1$ at the first interface, first, cutting in the vertical direction is performed on the composite membrane with pressing load of 1N (constant load mode). Here, by performing cutting at a shear angle of 45 degrees at a constant speed with a horizontal velocity of 2 µm/second and a vertical velocity of 0.2

μm/second, the knife is moved down to a predetermined depth in the composite membrane. At the point at which a load in a horizontal direction (horizontal force) applied to the knife is lowered due to peeling of the composite layer off from the active material-containing layer, the load in the vertical direction is controlled to be 0.5 N, such that a position of the knife in the vertical direction is maintained constant. Then, the horizontal force (load in the horizontal direction) is measured at a horizontal velocity of 2 μm/second. After the horizontal force associated with peeling becomes constant, measurement is continued over a region spanning a 1 mm length, and the average strength of the horizontal force measured in this region of length is taken as the peeling strength σ1. Further, the degree of evenness of the peeling strength σ1 in the first interface can be examined from the profile obtained by measuring the region of 1 mm length. If there is 10% or less of a region where deviation of the peeling strength σ1 is 100% or more towards the negative side in the profile, it can be determined that there has been obtained an electrode construct where crimpling of the composite membrane or generation of a large accumulation of liquid is not apt to occur. Both a measurement temperature and a sample temperature are set to be at room temperature (25° C.).

Similarly in the measurement of the peel strength σ2 at the second interface, too, cutting in the vertical direction is performed with pressing load of 1N (constant load mode), first. At the point at which a load in a horizontal direction (horizontal force) applied to the knife is lowered due to peeling of the active material-containing layer off from the current colleting layer, the load in the vertical direction is controlled to be 0.5 N, such that a position of the knife in the vertical direction is maintained constant. Then, the horizontal force (load in the horizontal direction) is measured at a horizontal velocity of 2 μm/second. After the horizontal force associated with peeling becomes constant, measurement is continued over a region spanning a 1 mm length, and the average strength of the horizontal force measured in this region of length is taken as the peeling strength σ2. The horizontal force (load in the horizontal direction) measured in the region where the horizontal force associated with peeling is constant is taken as the peeling strength σ2.

(Measurement Method of Coefficient of Air Permeability of Conjugate of Composite Membrane and Active Material-Containing Layer)

The coefficient of air permeability ($m^2$) of the conjugate of the composite membrane and the active material-containing layer is calculated as follows. In the calculation of the coefficient of air permeability KT, for example, in a case in which a conjugate having a thickness L (m) is to be measured, a gas having a viscosity coefficient of σ (Pa·s) is passed through a range of measurement area A ($m^2$). At this time, the gas is made to pass through under plural conditions in which the pressures p (Pa) of the gases introduced are different from each other, and the gas amount Q ($m^3/s$) passed through the conjugate is measured under each of the plural conditions. Thereafter, the gas amount Q with respect to the pressure p is plotted from the measurement results to determine dQ/dp, which is the slope. Thereafter, the coefficient of air permeability KT is calculated as in Equation (1) from the thickness L, the measurement area A, the coefficient of viscosity σ, and the slope dQ/dp.

$$KT=((\sigma \cdot L)/A) \times (dQ/dP) \quad (1)$$

In an example of the method for calculating the coefficient of air permeability KT, a conjugate is sandwiched between a pair of stainless steel plates each equipped with a hole having a diameter of 10 mm. Thereafter, air is sent through the hole of one stainless steel plate at a pressure p. Thereafter, the gas amount Q of the air leaking through the hole of the other stainless steel plate is measured. Hence, the area of the hole ($25\pi$ $mm^2$) is used as the measurement area A, and 0.000018 Pa·s is used as the coefficient of viscosity σ. Moreover, the gas amount Q is calculated by measuring the amount δ ($m^3$) leaking through the hole during 100 seconds and dividing the measured amount δ by 100.

Thereafter, at four points at which the pressure p differ from one another by at least 1000 Pa, the gas amount Q with respect to the pressure p is measured in the manner described above. For example, the gas amount Q with respect to the pressure p is measured at each of four points at which the pressure p is 1000 Pa, 2500 Pa, 4000 Pa, and 6000 Pa. Thereafter, the gas amount Q with respect to the pressure p at the four measured points is plotted and the slope (dQ/dp) of the gas amount Q with respect to the pressure p is calculated by straight line fitting (least squares method). Thereafter, the coefficient of air permeability KT is calculated by multiplying the calculated slope (dQ/dp) by (σ·L)/A.

When measuring the coefficient of air permeability of the conjugate, the conjugate is separated from other components of the battery. For example, the conjugate between the composite membraned and the active material-containing layer can be obtained by removing the current collecting layer off from the electrode construct. Both surfaces of the conjugate are washed with pure water, and thereafter the conjugate is immersed in pure water and left standing for 48 hours or longer. Then, both surfaces are further washed with pure water, and the conjugate is dried in a vacuum drying oven at 100° C. for 48 hours or longer. Thereafter, measurement of the coefficient of air permeability is performed. The coefficient of air permeability is measured at arbitrary plural places of the conjugate. A value at a place at which the coefficient of air permeability is the lowest value among the arbitrary plural places is taken as the coefficient of air permeability of the conjugate.

Since the active material-containing layer is coarser than the composite membrane, properties of the composite membrane is reflected in the coefficient of air permeability. As to the composite membrane including the substrate layer, since the substrate layer is coarser than the composite layer, properties of the composite layer is reflected in the coefficient of air permeability. When the denseness of the substrate layer is higher, the coefficient of air permeability of the conjugate tends to be lower.

(Measurement Method of Lithium Ion Conductivity of Inorganic Solid Particles)

Measurement of the lithium ion conductivity of the inorganic solid particles by the alternating-current impedance method will be explained. First, the inorganic solid particles are molded using a tablet-making machine, whereby a pressed powder body is obtained. Gold (Au) is deposited onto both surfaces of this pressed powder body, whereby a measurement sample is obtained. The alternating-current impedance of the measurement sample is measured by using an impedance measurement apparatus. As the measurement apparatus, model 1260 Frequency Response Analyzer manufactured by Solartron may be used, for example. The measurement is performed over a measurement frequency range of 5 Hz to 32 MHz at a temperature of 25° C. under argon atmosphere.

Subsequently, based on the measured alternating-current impedance, a complex impedance plot is prepared. The complex impedance plot involves plotting an imaginary component on a vertical axis and a real component on a horizontal axis. Ionic conductivity $\sigma_{Li}$ of the inorganic solid particles is calculated by equation (2) below. In the following equation, $Z_{Li}$ is a resistance value calculated from a diameter of an arc of the complex impedance plot, S is an area, and d is a thickness.

$$\sigma_{Li}=(1/Z_{Li})\times(d/S) \qquad (2)$$

(Measurement Method of pH of Aqueous Electrolyte)

The method of measuring pH of the first aqueous electrolyte and the second aqueous electrolyte is as follows.

The electrolytes (first aqueous electrolyte and second aqueous electrolyte), contained in the electrode and the composite membrane of the electrode construct taken out by disassembling the secondary battery, are extracted, the amount is measured, and a pH value is measured using a pH meter. The pH measurement is performed, for example, as follows. The measurement is performed using, for example, F-74 manufactured by HORIBA, Ltd. in an environment of 25±2° C. First, reference solutions of pH 4.0, 7.0 and 9.0 are prepared. Next, using these reference solutions, calibration of F-74 is carried out. An appropriate amount of electrolyte (electrolytic solution) of the measurement target is placed in a container, and pH is measured. After measurement of pH, the sensor unit of F-74 is washed. When another measurement target is measured, the above-described procedure, i.e., calibration, measurement, and washing, is performed each time.

The electrode construct according to the first embodiment includes: an electrode including an active material-containing layer including a first principal surface and a second principal surface, and a current collecting layer in contact with the second principal surface of the active material-containing layer; and a composite membrane including a composite layer in contact with the first principal surface of the active material-containing layer. In the active material-containing layer, the second principal surface is on a reverse side of the first principal surface. The composite layer of the composite membrane contains inorganic solid particles and a polymeric material. A peel strength σ1 at a first interface between the active material-containing layer and the composite layer is greater than a peel strength σ2 at a second interface between the active material-containing layer and the current collecting layer. The peel strength σ2 is 1 N/cm or less. The electrode construct can realize a secondary battery exhibiting high charge-discharge efficiency and having suppressed self-discharge.

Second Embodiment

According to a second embodiment, provided is an electrode group including the electrode construct according to the first embodiment and a counter electrode with respect to the electrode included in the electrode construct.

In the electrode group, the composite membrane included in the electrode construct is positioned at least partly between the electrode and the counter electrode. The composite membrane has a function as a separator electrically insulating the electrode and the counter electrode.

While the composite membrane included in the electrode construct functions as a separator of the battery, the electrode group may further include another separator independent from the composite membrane. For example, a nonwoven fabric or the like that can be used for the substrate layer described in the first embodiment may be used as a separator, and provided between the electrode construct and the counter electrode.

In the electrode group, the electrode included in the electrode construct may be a negative electrode. The counter electrode with respect to the above-described electrode may be a positive electrode. That is, the electrode group may include a negative electrode, a composite membrane, and a positive electrode. By positioning at least part of the composite membrane between the negative electrode and the positive electrode, the composite membrane can exhibit a function as a separator electrically insulating these electrodes. It can be said that such an electrode group is an electrode group including a positive electrode and a negative electrode construct including a negative electrode and a composite membrane.

The counter electrode contains a second electrode active material. If the counter electrode is a positive electrode, a positive electrode active material is contained as the second electrode active material.

Hereinafter, a description will be given of an aspect in which the electrode included in the electrode construct is a negative electrode and its counter electrode is a positive electrode.

Details of the negative electrode are the same as those described in the first embodiment for the electrode included in the electrode construct. The description will be redundant and thus omitted. For the composite membrane included in the electrode construct (negative electrode construct) as well, details thereof will overlap those described in the first embodiment, and the description will be omitted.

The positive electrode may include a current collector (positive electrode current collector) and a positive electrode active material-containing layer disposed on at least one principal surface of the current collector. The positive electrode active material-containing layer contains a positive electrode active material, and optionally an electro-conductive agent and a binder.

The positive electrode current collector is made of, for example, a metal such as stainless steel, aluminum (Al), or titanium (Ti). The positive electrode current collector has a form of, for example, a foil, a porous body, or a mesh. To prevent corrosion by the reaction between the positive electrode current collector and the aqueous electrolyte, the surface of the positive electrode current collector may be covered with a different kind of element. The positive electrode current collector is preferably made of a material with excellent corrosion resistance and oxidation resistance, for example, a Ti foil. Note, that when $Li_2SO_4$ is used as the aqueous electrolyte, Al may be used as the positive electrode current collector because corrosion does not proceed.

The positive electrode current collector may include a portion that does not have the positive electrode active material-containing layer provided on surface thereof. This portion can serve as a positive electrode current collecting tab.

The positive electrode active material-containing layer contains the positive electrode active material. The positive electrode active material-containing layer may be supported on principal surfaces on both of reverse surfaces of the positive electrode current collector.

As the positive electrode active material (second electrode active material), a compound whose lithium ion insertion-extraction potential is 2.5 V (vs. Li/Li$^+$) to 5.5 V (vs. Li/Li$^+$) with respect to the oxidation-reduction potential of lithium may be used. The positive electrode may contain one compound alone as the positive electrode active material, or may contain two or more compounds as the positive electrode active material.

Examples compounds that may be used as the positive electrode active material include a lithium manganese composite oxide, a lithium nickel composite oxide, a lithium cobalt aluminum composite oxide, a lithium nickel cobalt manganese composite oxide, a spinel lithium manganese nickel composite oxide, a lithium manganese cobalt composite oxide, a lithium iron oxide, a lithium fluorinated iron sulfate, a phosphate compound having an olivine crystal structure (for example, a compound represented by $Li_kFePO_4$ where $0<k\leq1$, a compound represented by $Li_kMnPO_4$ where $0<k\leq1$), and the like. The phosphate compound having an olivine crystal structure has excellent thermal stability.

Examples of compounds capable of obtaining a high positive electrode potential include lithium manganese composite oxides of spinel structure, e.g., a compound represented by $Li_kMn_2O_4$ where $0<k\leq1$ or a compound represented by $Li_kMnO_2$ where $0<k\leq1$; a lithium nickel aluminum composite oxide, e.g., a compound represented by $Li_kNi_{1-i}Al_iO_2$ where $0<k\leq1$ and $0<i<1$; a lithium cobalt composite oxide, e.g., a compound represented by $Li_kCoO_2$ where $0<k\leq1$; a lithium nickel cobalt composite oxide, e.g., a compound represented by $Li_kNi_{1-i-t}Co_iMn_tO_2$ where $0<k\leq1$, $0<i<1$, and $0\leq t<1$; a lithium manganese cobalt composite oxide, e.g., a compound represented by $Li_kMn_iCo_{1-i}O_2$ where $0<k\leq1$ and $0<i<1$; a spinel lithium manganese nickel composite oxide, e.g., a compound represented by $Li_kMn_{2-x}Ni_xO_4$ where $0<k\leq1$ and $0<\kappa<2$; a lithium phosphate having an olivine structure, e.g., a compound represented by $Li_kFePO_4$ where $0<k\leq1$, a compound represented by $Li_kFe_{1-y}Mn_yPO_4$ where $0<k\leq1$ and where $0\leq y\leq1$, or a compound represented by $Li_kCoPO_4$ where $0<k\leq1$; and a fluorinated iron sulfate (e.g., a compound represented by $Li_kFeSO_4F$ where $0<k\leq1$).

The positive electrode active material preferably includes at least one selected from the group consisting of the lithium cobalt composite oxide, the lithium manganese composite oxide, and the lithium phosphate having an olivine structure. The operating potentials of these compounds are 3.5 V (vs. $Li/Li^+$) to 4.2 V (vs. $Li/Li^+$). That is, the operating potentials of these compounds as active material are relatively high. When these compounds are used in combination with the above-described negative electrode active material such as the spinel lithium titanate or the anatase titanium oxide, a high battery voltage can be obtained.

The positive electrode active material is contained in the positive electrode in a form of, for example, particles. The positive electrode active material particles may be single primary particles, secondary particles that are agglomerates of primary particles, or a mixture of primary particles and secondary particles. The shape of a particle is not particularly limited and may be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm. The primary particle size and the secondary particle size of the positive electrode active material can be measured by the same method as that for the negative electrode active material particles.

The positive electrode active material-containing layer may contain an electro-conductive agent, a binder, and the like in addition to the positive electrode active material.

The electro-conductive agent is mixed as needed to raise current collection performance and suppress the contact resistance between the active material and the current collector. Examples of the electro-conductive agent include carbonaceous materials such as acetylene black, Ketjen black, graphite, and coke. The electro-conductive agent may be of one species, or two or more species may be used in mixture.

As the binder, for example, polytetrafluoroethylene (PTFE), polyvinylidene fluoride (PVdF), fluororubber, ethylene-butadiene rubber, polypropylene (PP), polyethylene (PE), carboxymethyl cellulose (CMC), polyimide (PI), polyacrylimide (PAI), or the like may be used. The binder may be of one species, or two or more species may be used in mixture.

The blending proportions of the positive electrode active material, the electro-conductive agent, and the binder in the positive electrode active material-containing layer are preferably 70% by mass to 95% by mass, 3% by mass to 20% by mass, and 2% by mass to 10% by mass, respectively. If the blending proportion of the electro-conductive agent is 3% by mass or more, the electrical conductivity of the positive electrode can be made good. If the blending proportion of the electro-conductive agent is 20% by mass or less, decomposition of the aqueous electrolyte on the electro-conductive agent surface can be reduced. If the blending proportion of the binder is 2% by mass or more, a sufficient electrode strength can be obtained. If the blending proportion of the binder is 10% by mass or less, insulating portions of the electrode can be diminished.

The positive electrode can be obtained by, for example, the following method. First, the positive electrode active material, electro-conductive agent, and binder are suspended in an appropriate solvent to prepare a slurry. The slurry is applied onto one surface or both surfaces of the positive electrode current collector. The coating film on the positive electrode current collector is dried, thereby forming an active material-containing layer. After that, pressing is performed on the positive electrode current collector and the positive electrode active material-containing layer formed thereon. As the positive electrode active material-containing layer, one where the mixture of the positive electrode active material, electro-conductive agent, and binder formed into pellets may be used.

Figure 2:
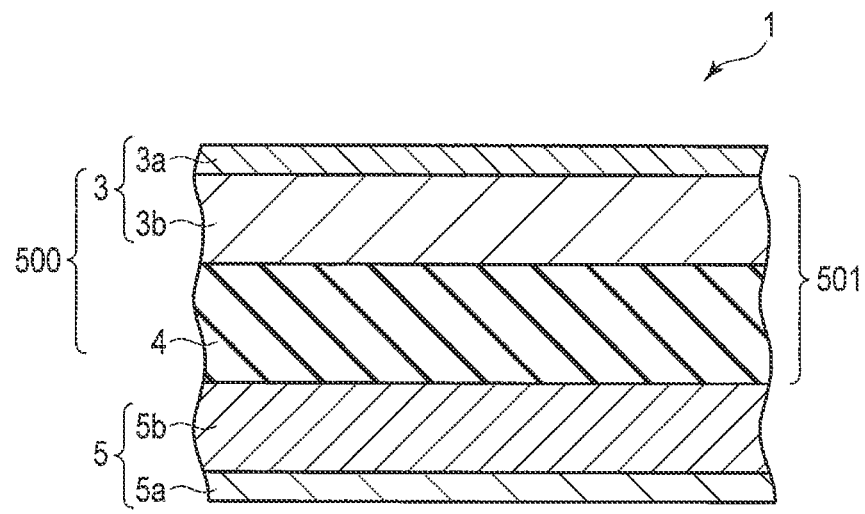
FIG. 2 is a cross-sectional view schematically showing an example of an electrode group according to an embodiment.

FIG. 2 is a cross-sectional view schematically showing an example of the electrode group according to the embodiment. The electrode group 1 shown in FIG. 2 includes a negative electrode 3, a positive electrode 5, and a composite membrane positioned between the negative electrode 3 and the positive electrode 5. The negative electrode 3 includes a negative electrode current collecting layer 3a and a negative electrode active material-containing layer 3b in contact with the negative electrode current collecting layer 3a. The negative electrode 3 and the composite membrane 3 configure an electrode construct (negative electrode construct) 500. The positive electrode 5 includes a positive electrode current collector 5a and a positive electrode active material-containing layer 5b supported on one of the principal surfaces of the positive electrode current collector 5a.

The electrode group according to the second embodiment includes the electrode construct according to the first embodiment and a counter electrode in respect of the electrode included in the electrode construct. The electrode group can realize a secondary battery that exhibits high charge-discharge efficiency and has suppressed self-discharge.

Third Embodiment

According to a third embodiment, provided is a secondary battery including the electrode group according to the second embodiment and an aqueous electrolyte. The aqueous electrolyte includes water.

The secondary battery according to the third embodiment may further include a container member that houses the electrode group and the aqueous electrolyte.

Furthermore, the secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. Moreover, the secondary battery includes an aqueous electrolyte secondary battery including an aqueous electrolyte.

The aqueous electrolyte may be held in the electrode group. The aqueous electrolyte includes the first aqueous electrolyte held in the electrode (negative electrode) of the electrode construct and the second aqueous electrolyte held in the composite membrane, in the electrode group, and may further include a third aqueous electrolyte held in the positive electrode.

Details of the third aqueous electrolyte are the same as those of the aqueous electrolytes (first aqueous electrolyte and second aqueous electrolyte) described in the first embodiment, and will be omitted. The first aqueous electrolyte, the second aqueous electrolyte, and the third aqueous electrolyte may have the same composition or different compositions. In the following description, unless specified, the first aqueous electrolyte, the second aqueous electrolyte, and the third aqueous electrolyte are simply referred to as "aqueous electrolyte" collectively.

The pH of the aqueous electrolyte on the negative electrode side and that on the positive electrode side are preferably different after the initial charge. In the secondary battery after the initial charge, the pH of the aqueous electrolyte on the negative electrode side is preferably 3 or more, more preferably 5 or more, and even more preferably 7 or more. In the secondary battery after the initial charge, the pH of the aqueous electrolyte on the positive electrode side preferably falls within the range of 0 to 7, and more preferably falls within the range of 0 to 6.

The pHs of the aqueous electrolytes on the negative electrode side and the positive electrode side can be obtained by, for example, disassembling the secondary battery and measuring the pH of the aqueous electrolyte present between the separator and the negative electrode and the pH of the aqueous electrolyte present between the separator and the positive electrode.

As the container member that houses the electrode group and the aqueous electrolyte, a metal container, a laminated film container, or a resin container may be used.

As the metal container, a metal can made of nickel, iron, stainless steel, or the like and having a rectangular shape or a cylindrical shape may be used. As the resin container, a container made of polyethylene, polypropylene, or the like may be used.

The plate thickness of each of the resin container and the metal container preferably falls within the range of 0.05 mm to 1 mm. The plate thickness is more preferably 0.5 mm or less, and even more preferably 0.3 mm or less.

As the laminated film, for example, a multilayered film formed by covering a metal layer with a resin layer may be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. The thickness of the laminated film preferably falls within the range of 0.01 mm to 0.5 mm. The thickness of the laminated film is more preferably 0.2 mm or less.

The secondary battery according to the embodiment may be used in various forms such as a rectangular shape, a cylindrical shape, a flat form, a thin form, and a coin form. In addition, the secondary battery may be a secondary battery having a bipolar structure. A secondary battery having a bipolar structure has an advantage of being able to produce a cell with in-series connection of multiple, using a single cell.

The negative electrode terminal may be formed, for example, from a material that is electrochemically stable within a potential range of 1 V to 3 (vs. Li/Li$^+$) with respect to the oxidation-reduction potential of lithium, and having electrical conductivity. Specifically, the material for the negative electrode terminal may include zinc, copper, nickel, stainless steel, aluminum, or an aluminum alloy containing at least one element selected from a group consisting of Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector (e.g., the current collecting layer included in the negative electrode construct), the negative electrode terminal is preferably made of the same material as that of the negative electrode current collector.

The positive electrode terminal may be made, for example, from a material that is electrically stable in a potential range of 2.5 V to 4.5 V (vs. Li/Li$^+$) with respect to the oxidation-reduction potential of lithium, and having electrical conductivity. Examples of the material for the positive electrode terminal include titanium, aluminum, or an aluminum alloy containing at least one element selected from a group consisting of Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

Figure 3:
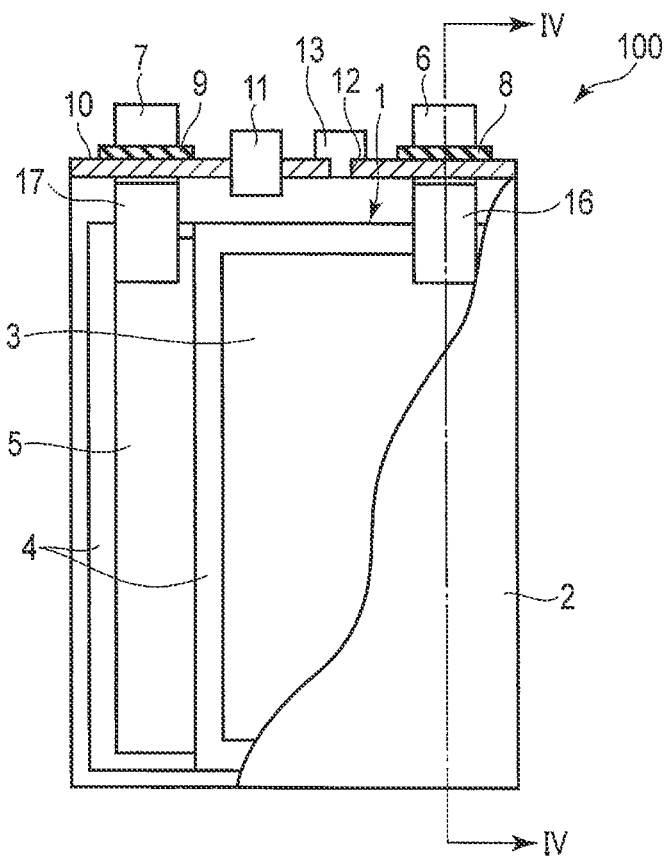
FIG. 3 is a cross-sectional view schematically showing an example of the secondary battery according to an embodiment.
Figure 4:
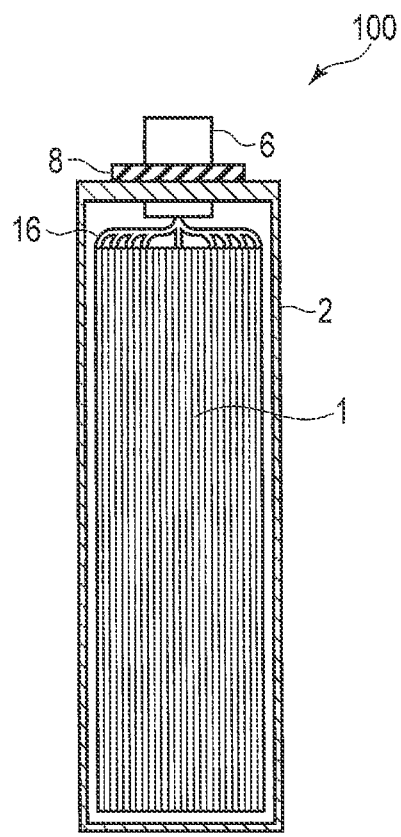
FIG. 4 is a cross-sectional view of the secondary battery shown in FIG. 3 taken along a line IV-IV.

Details of the secondary battery according to the embodiment will be described below with reference to FIGS. 3 and 4. FIG. 3 is a cross-sectional view schematically showing an example of the secondary battery according to the embodiment. FIG. 4 is a cross-sectional view of the secondary battery shown in FIG. 3 taken along a line IV-IV.

An electrode group 1 is housed in a container member 2 made of a rectangular tubular metal container. The electrode group 1 includes an electrode construct (negative electrode construct) including a negative electrode 3 and a composite membrane 4, and a positive electrode 5, which is a counter electrode to the negative electrode 3. The electrode group 1 has a structure formed by arranging the electrode construct and the positive electrode 5 in such a manner that the composite membrane 4 as a separator is interposed between the positive electrode 3 and the negative electrode 3, and spirally wound so as to form a flat shape. An aqueous electrolyte (not shown) is held in the electrode group 1. As shown in FIG. 3, a strip-shaped negative electrode lead 16 is electrically connected to each of plural portions at an end of the negative electrode 5 located on an end face of the electrode group 1. In addition, a strip-shaped positive electrode lead 17 is electrically connected to each of plural portions at an end of the positive electrode 5 located on the end face. The plural negative electrode leads 16 are electrically connected to a negative electrode terminal 6 in a bundled state, as shown in FIG. 4. In addition, the plural positive electrode leads 17 are similarly electrically connected to a positive electrode terminal 7 in a bundled state, although not shown.

A sealing plate 10 made of metal is fixed to the opening portion of the container member 2 made of metal by welding or the like. The negative electrode terminal 6 and the positive electrode terminal 7 are extracted to the outside from outlet holes provided in the sealing plate 10, respectively. On the inner surfaces of the outlet holes of the sealing plate 10, a negative electrode gasket 8 and a positive electrode gasket 9 are arranged to avoid a short circuit caused by contact respective with the negative electrode terminal 6 and the positive electrode terminal 7. By providing the negative electrode gasket 8 and the positive electrode gasket 19, the airtightness of the secondary battery 100 can be maintained.

A control valve 11 (safety valve) is provided on the sealing plate 10. When the internal pressure of the battery cell is raised by gas generated by electrolysis of the aqueous solvent, the generated gas can be released from the control valve 11 to the outside. As the control valve 11 there may be used, for example, a return type valve that operates when the internal pressure exceeds a predetermined value and functions as a sealing plug when the internal pressure lowers. Alternatively, there may be used a non-return type valve that cannot recover the function as a sealing plug once it operates. In FIG. 3, the control valve 11 is disposed at the center of the sealing plate 10. However, the position of the control valve 11 may be an end of the sealing plate 10. The control valve 11 may be omitted.

Additionally, an inlet 12 is provided on the sealing plate 10. The aqueous electrolyte may be put in via the inlet 12. The inlet 12 may be closed with a sealing plug 13 after the aqueous electrolyte is put in. The inlet 12 and the sealing plug 13 may be omitted.

Figure 5:
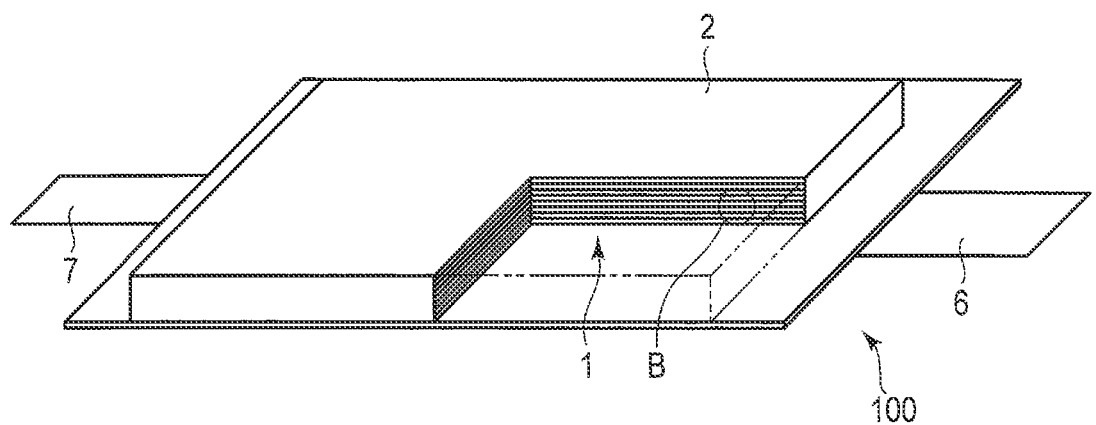
FIG. 5 is a partially cut-out perspective view schematically showing another example of a secondary battery according to the embodiment.
Figure 6:
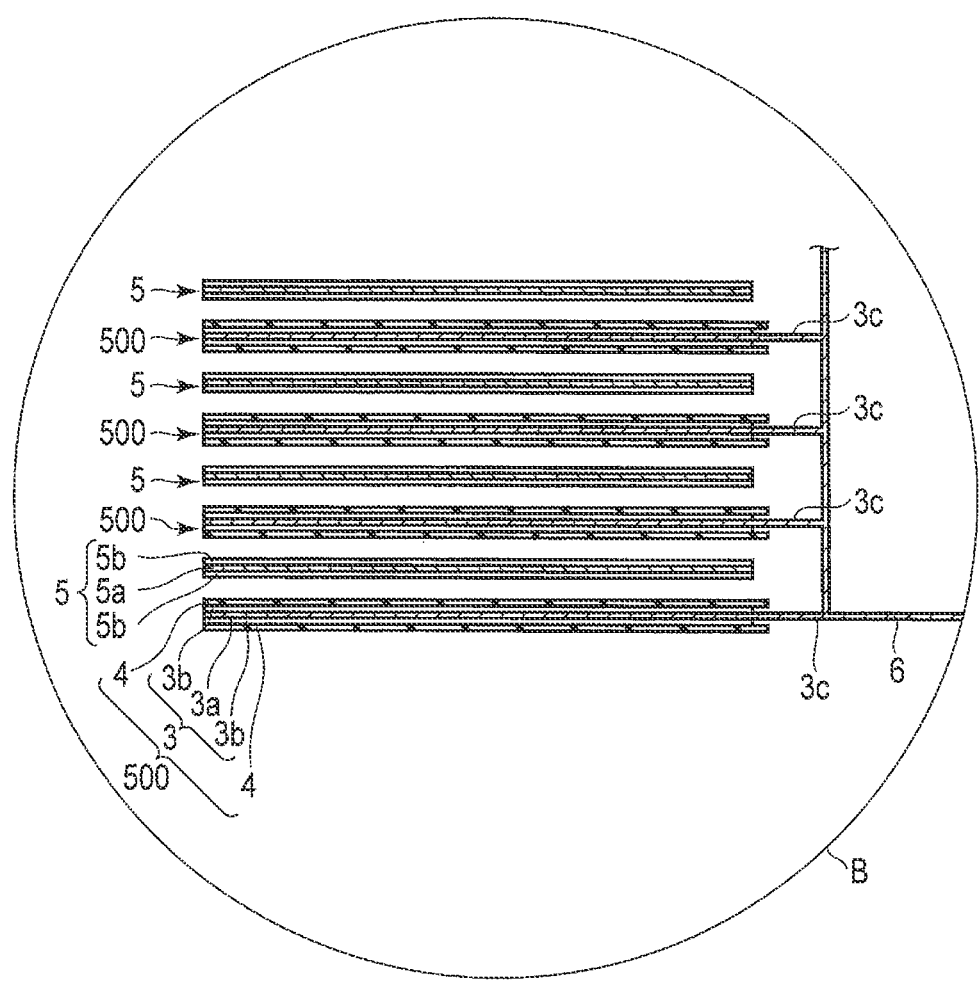
FIG. 6 is an enlarged cross-sectional view of section B of the secondary battery shown in FIG. 5.

FIG. 5 is a partially cut out perspective view schematically showing another example of the secondary battery according to the embodiment. FIG. 6 is an enlarged sectional view of section B of the secondary battery shown in FIG. 5. FIG. 5 and FIG. 6 show an example of the secondary battery 100 using a laminated film container member as a container member.

The secondary battery 100 shown in FIGS. 5 and 6 includes an electrode group 1 shown in FIGS. 5 and 6, a container member 2 shown in FIG. 5, and an aqueous electrolyte, which is not shown. The electrode group 1 and the aqueous electrolyte are housed in the container member 2. The aqueous electrolyte is held in the electrode group 1.

The container member 2 is made of a laminated film including two resin layers and a metal layer sandwiched between the resin layers.

As shown in FIG. 6, the electrode group 1 is a stacked electrode group. The stacked electrode group 1 has a structure in which electrode constructs 500 and positive electrodes 5 are alternately stacked.

The electrode group 1 includes plural electrode constructs 500. Each of the electrode constructs 500 include a negative electrode 3 and composite membranes 4 supported on both faces of the negative electrode 3. Each negative electrode 3 includes a negative electrode current collecting layer 3a and negative electrode active material-containing layers 3b arranged on both surfaces of the negative electrode current collecting layer 3a. Each of the composite membranes 4 are respectively supported on the negative electrode active material-containing layers 3b of the negative electrodes 3. The electrode group 1 further includes plural positive electrodes 5. Each of the positive electrodes 5 includes a positive electrode current collector 5a and positive electrode active material-containing layers 5b supported on both surfaces of the positive electrode current collector 5a.

The negative electrode current collecting layer 3a of each of the negative electrodes 3 includes at one end, a portion 3c where the negative electrode active material-containing layer 3b is not provided on any surface. The portion 3c serves as a negative electrode current collecting tab. As shown in FIG. 6, the portion 3c serving as the negative electrode current collecting tab 3c does not overlap the positive electrode 5. Plural negative electrode current collecting tabs (portions 3c) are electrically connected to a belt-shaped negative electrode terminal 6. A leading end of the belt-shaped negative electrode terminal 6 is drawn to the outside from the container member 2.

Although not shown, the positive electrode current collector 5a of each of the positive electrodes 5 includes at one end a portion where the positive electrode active material-containing layer 5b is not supported on any surface. This portion serves as a positive electrode current collecting tab. Like the negative electrode current collecting tab (portion 3c), the positive electrode current collecting tab does not overlap the negative electrode 3. Further, the positive electrode current collecting tab is located on the opposite side of the electrode group 1 with respect to the negative electrode current collecting tab (portion 3c). The positive electrode current collecting tab is electrically connected to a belt-shaped positive electrode terminal 7. A leading end of the belt-shaped positive electrode terminal 7 is located on the opposite side of the negative electrode terminal 6 and drawn to the outside from the container member 2.

The secondary battery according to the third embodiment includes the electrode according to the second embodiment. Therefore, the secondary battery can exhibit high charge-discharge efficiency, and also has suppressed self-discharge.

Fourth Embodiment

According to a fourth embodiment, a battery module is provided. The battery module includes plural of secondary batteries according to the third embodiment.

In the battery module, each of the single-batteries may be arranged to be electrically connected in series or in parallel, or may be arranged in combination of in-series connection and in-parallel connection.

An example of the battery module will be described next with reference to the drawings.

Figure 7:
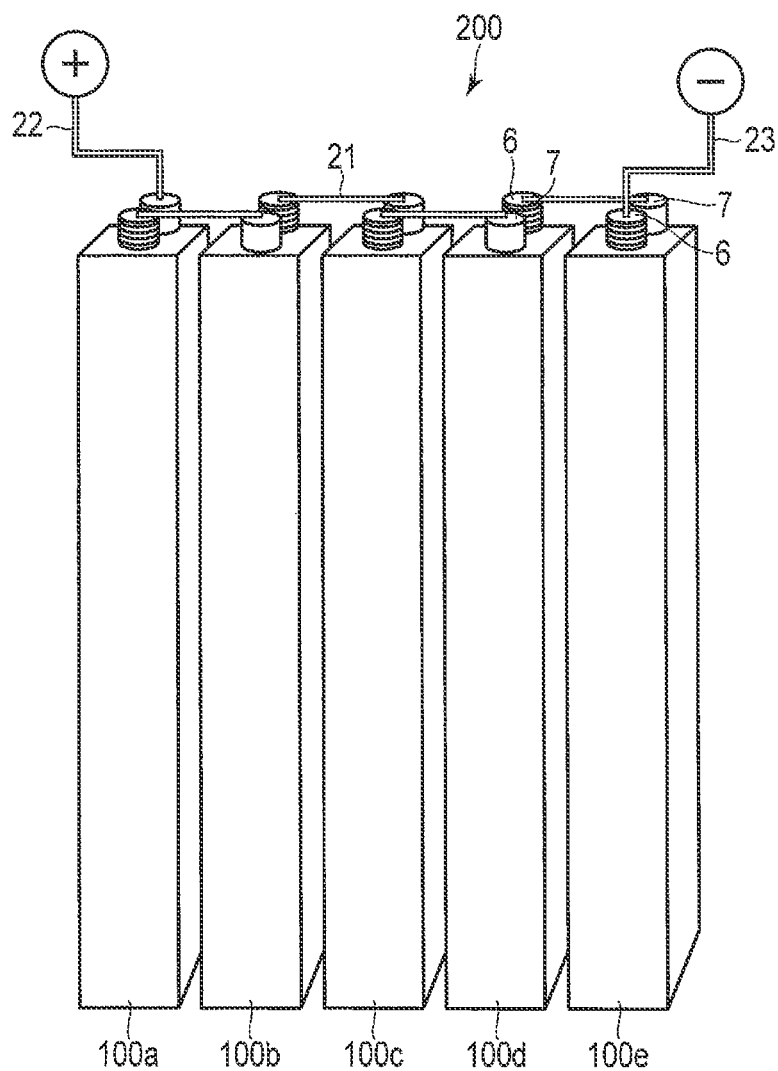
FIG. 7 is a perspective view schematically showing an example of the battery module according to an embodiment.

FIG. 7 is a perspective view schematically showing an example of the battery module. The battery module 200 shown in FIG. 7 includes five single-batteries 100a to 100e, four bus bars 21, a positive electrode-side lead 22, and a negative electrode-side lead 23. Each of the five single-batteries 100a to 100e is the secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 7 is a battery module of five in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the embodiment includes a secondary battery according to an embodiment. Therefore, the battery module can exhibit high charge-discharge efficiency, and also has suppressed self-discharge.

Fifth Embodiment

According to a fifth embodiment, provided is a battery pack including the secondary battery according to the third embodiment. The battery pack may include a battery module according to the fourth embodiment. The battery pack may include a single secondary battery according to the third embodiment, in place of the battery module according to the fourth embodiment.

The battery pack may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack may further include an external power distribution terminal. The external power distribution terminal is configured to externally output electric current from the secondary battery, and/or to input external electric current into the secondary battery. In other words, when the battery pack is used as a power source, electric current is provided out via the external power distribution terminal. When the battery pack is charged, the charging current (including regenerative energy of motive force of vehicles such as automobiles) is provided to the battery pack via the external power distribution terminal.

Next, an example of a battery pack according to the embodiment will be described with reference to the drawings.

Figure 8:
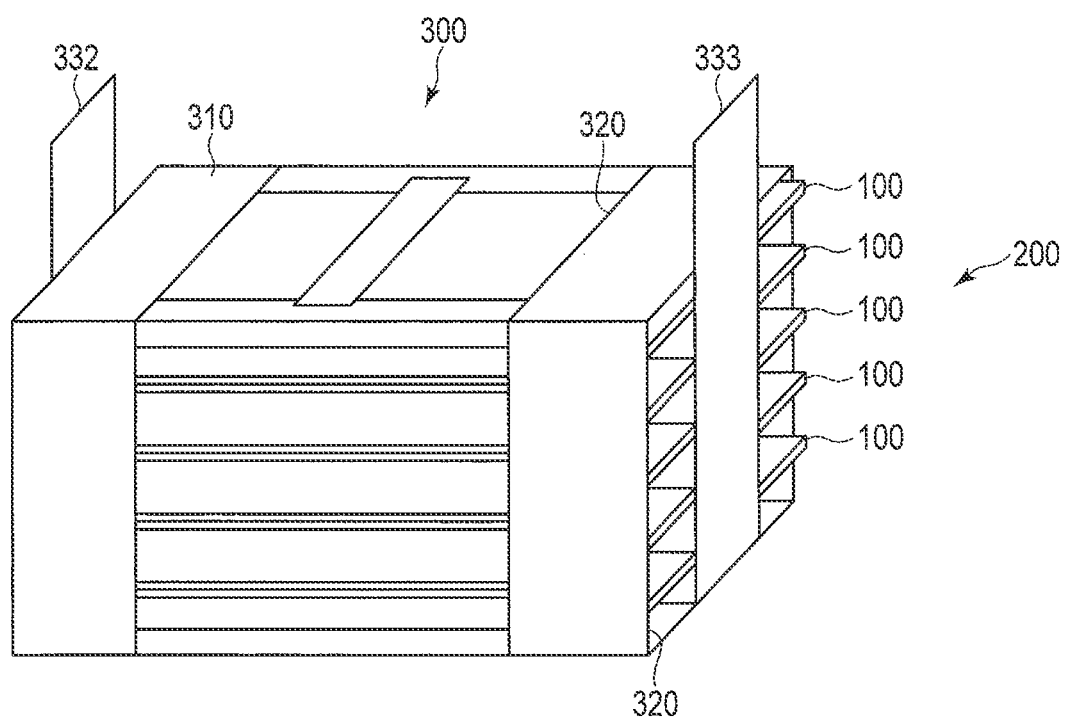
FIG. 8 is a perspective view schematically showing an example of a battery pack according to an embodiment.

FIG. 8 is a perspective view schematically showing an example of the battery pack according to the embodiment.

A battery pack 300 includes a battery module configured of the secondary battery shown in FIGS. 5 and 6. The battery pack 300 includes a housing 310, and a battery module 200 housed in the housing 310. In the battery module 200, plural (for example, five) secondary batteries 100 are electrically connected in series. The secondary batteries 100 are stacked in a thickness direction. The housing 310 has an opening 320 on each of an upper portion and four side surfaces. The side surfaces, from which the positive and negative electrode terminals 6 and 7 of the secondary batteries 100 protrude, are exposed through the opening 320 of the housing 310. A positive electrode terminal 332 for output of the battery module 200 is belt-shaped, and one end thereof is electrically connected to any or all of the positive electrode terminals 7 of the secondary batteries 100, while the other end protrudes beyond the opening 320 of the housing 310 and thus protrudes past the upper portion of the housing 310. Meanwhile, a negative electrode terminal 333 for output of the battery module 200 is belt-shaped, and one end thereof is electrically connected to any or all of the negative electrode terminals 6 of the secondary batteries 100, while the other end protrudes beyond the opening 320 of the housing 310 and thus protrudes past the upper portion of the housing 310.

Figure 9:
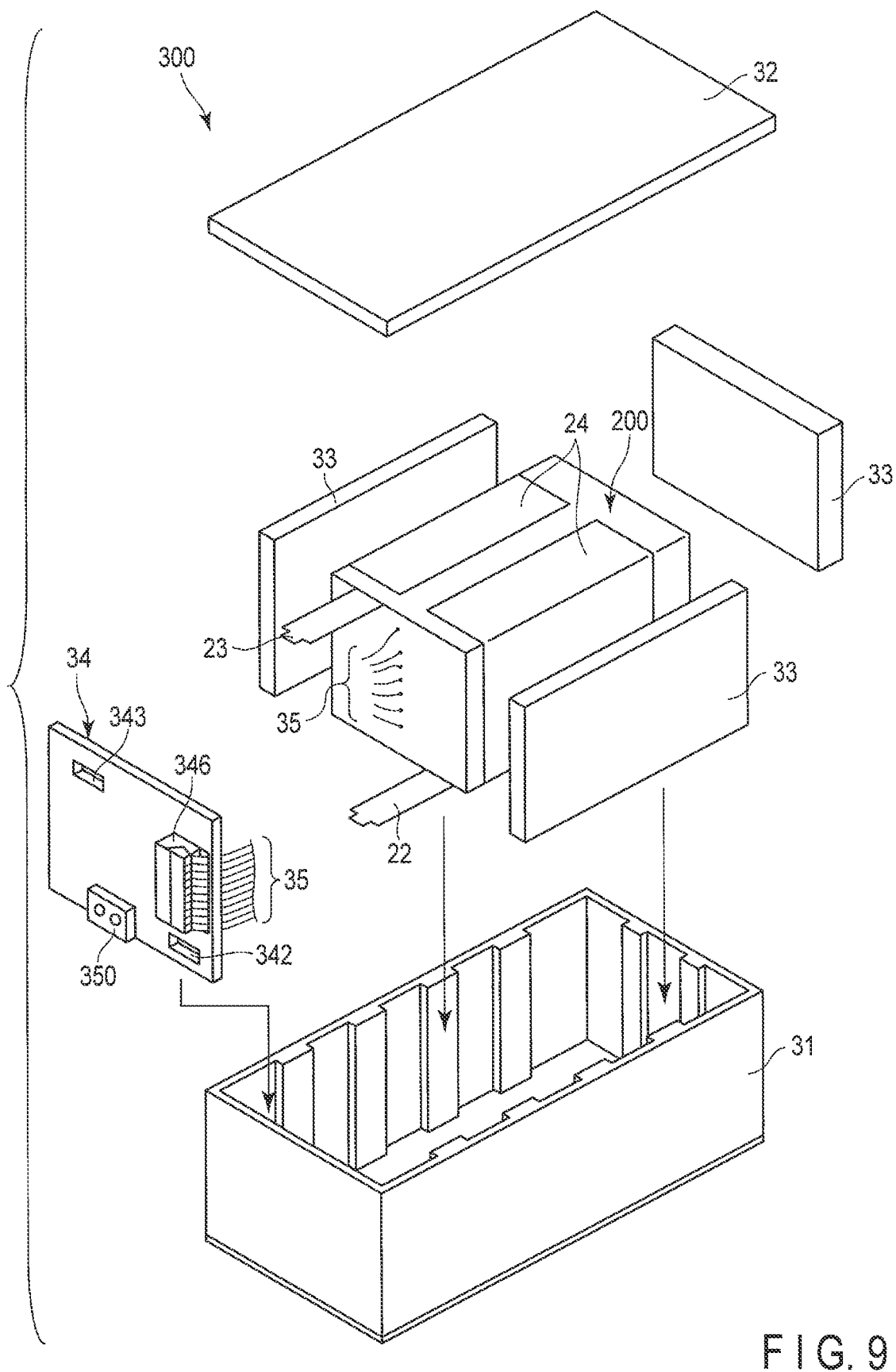
FIG. 9 is an exploded perspective view schematically showing another example of the battery pack according to the embodiment.
Figure 10:
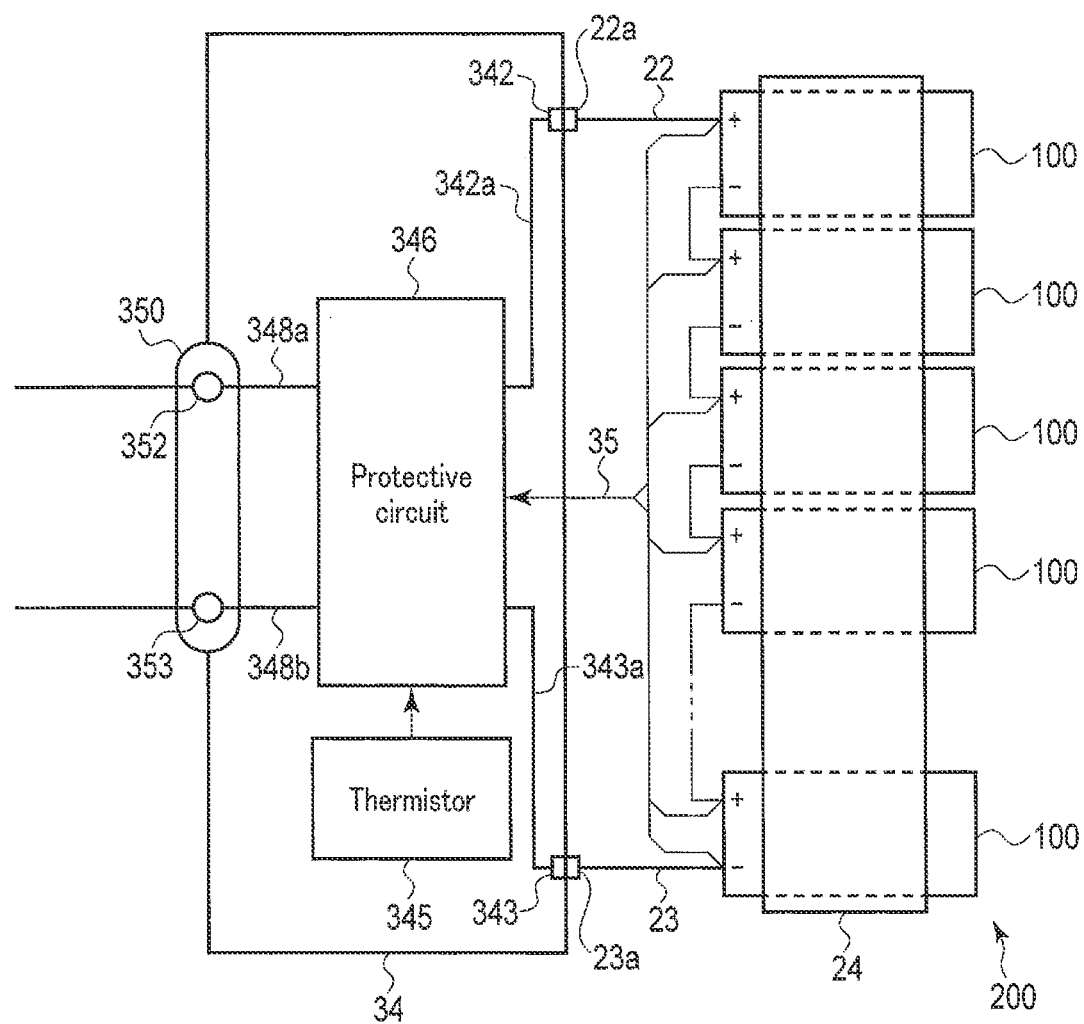
FIG. 10 is a block diagram showing an example of an electric circuit of the battery pack shown in FIG. 9.

Another example of the battery pack is explained in detail with reference to FIG. 9 and FIG. 10. FIG. 9 is an exploded perspective view schematically showing another example of the battery pack according to the embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output electric current from the battery module 200 to an external device and input electric current from an external device to the battery module 200 via the external power distribution terminal 350. In other words, when using the battery pack 300 as a power source, the electric current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fifth embodiment is provided with the secondary battery according to the third embodiment or the battery module according to the fourth embodiment. Accordingly, the battery pack can exhibit high charge-discharge efficiency, and also has suppressed self-discharge.

Sixth Embodiment

According to a sixth embodiment, provided is a vehicle including the battery pack according to the fifth embodiment.

In the vehicle, the battery pack is configured, for example, to recover regenerative energy from motive force of the vehicle. The vehicle may include a mechanism (e.g., a regenerator) for converting kinetic energy of the vehicle into regenerative energy.

Examples of the vehicle according to the embodiment include two- to four-wheeled hybrid electric automobiles, two- to four-wheeled electric automobiles, power assisted bicycles, and railway cars.

In the vehicle according to the embodiment, the installing position of the battery pack is not particularly limited. For example, the battery pack may be installed in the engine compartment of the vehicle, in rear parts of the vehicle, or under seats.

The vehicle according to the embodiment may have plural battery packs installed thereon. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

Next, an example of the vehicle according to the embodiment will be described with reference to the drawings.

Figure 11:
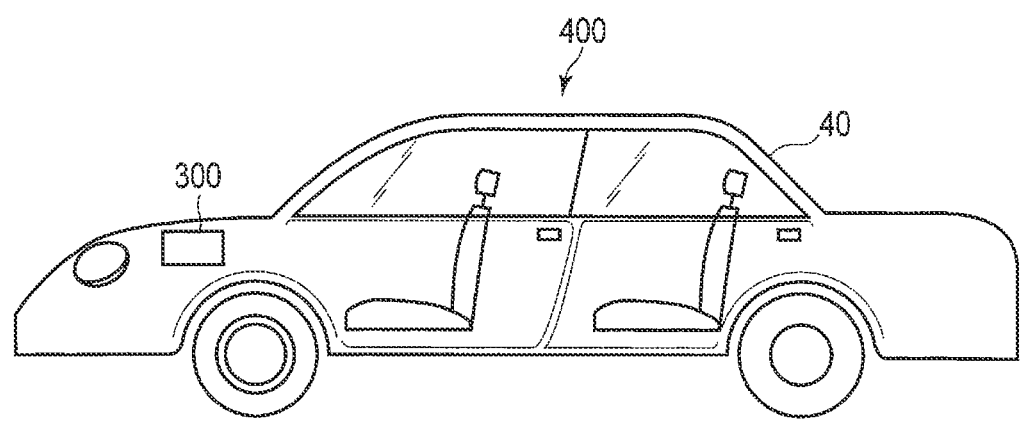
FIG. 11 is a partially see-through diagram schematically showing an example of the vehicle according to an embodiment.

FIG. 11 is a partially see-through diagram schematically showing an example of a vehicle according to the embodiment.

The vehicle 400 shown in FIG. 11 includes a vehicle body 40 and a battery pack 300 according to the fifth embodiment. In the example shown in FIG. 11, the vehicle 400 is a four-wheeled automobile.

This vehicle 400 may have plural battery packs 300 installed. In such a case, the batteries (single-batteries or battery modules) included in the battery packs 300 may be connected in series, connected in parallel, or connected in a combination of in-series connection and in-parallel connection.

In FIG. 11, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

The vehicle according to the sixth embodiment has the battery pack according to the fifth embodiment installed therein. Therefore, the vehicle is excellent in drive performance and reliability.

Seventh Embodiment

According to a seventh embodiment, provided is a stationary power supply including the battery pack according to the fifth embodiment.

The stationary power supply may have the battery module according to the fourth embodiment or the secondary battery according to the third embodiment installed therein, instead of the battery pack according to the fifth embodiment. The stationary power supply according to the embodiment can realize long life.

Figure 12:
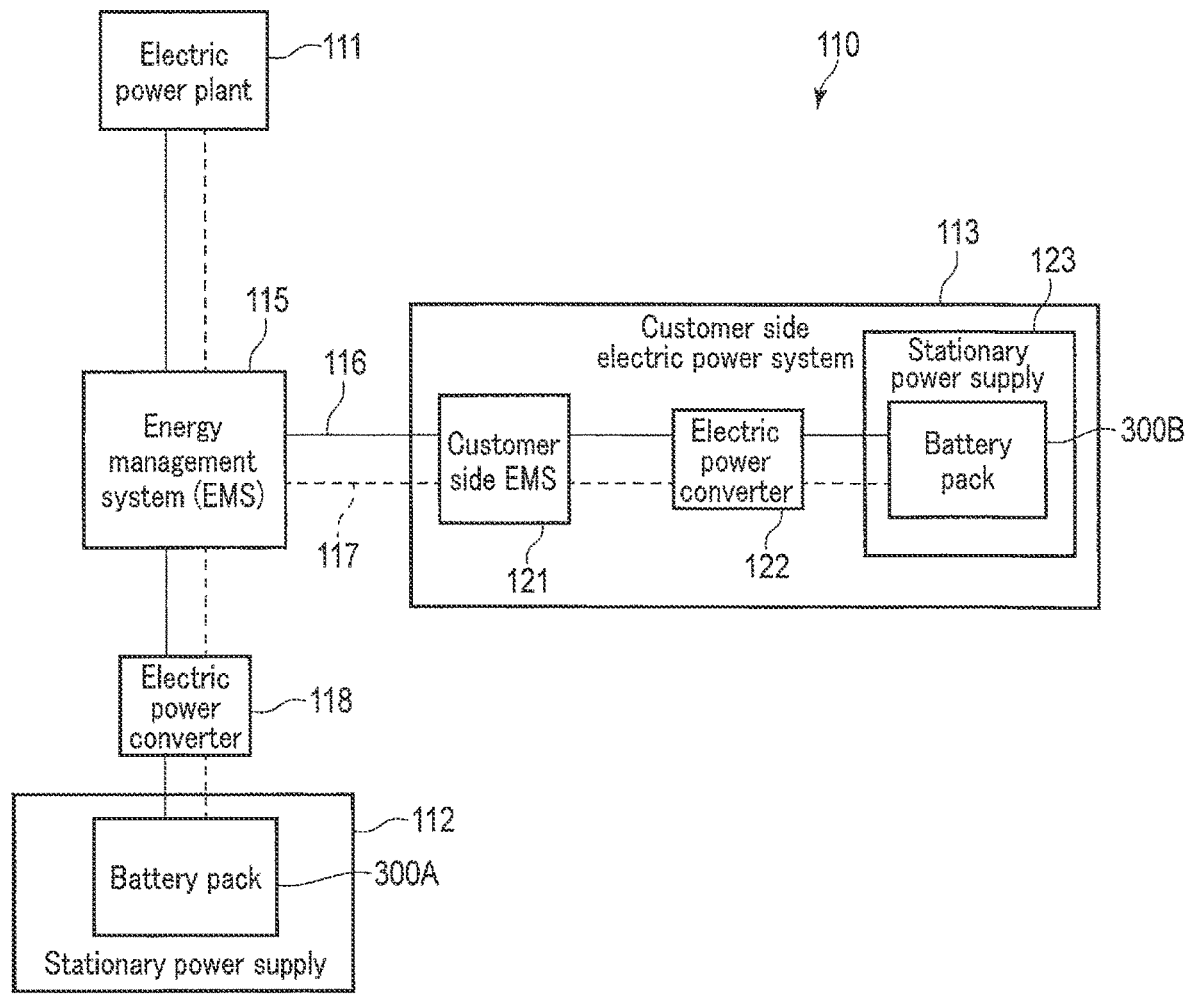
FIG. 12 is a block diagram showing an example of a system including a stationary power supply according to an embodiment.

FIG. 12 is a block diagram showing an example of a system including the stationary power supply according to the embodiment. FIG. 12 is a diagram showing an application example to stationary power supplies 112, 123 as an example of use of battery packs 300A, 300B according to an embodiment. In the example shown in FIG. 12, shown is a system 110 in which the stationary power supplies 112, 123 are used. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large capacity of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Example 1

<Production of Electrode Construct>

An electrode construct was produced by the following method.

First, a composite membrane as separator was fabricated. A cellulose-based nonwoven fabric having a thickness of 15 μm was prepared as the substrate layer. Next, inorganic solid particles and a polymeric material were mixed with N-methyl-2-pyrrolidone (NMP) to obtain a slurry for composite layer formation. LATP ($Li_{1.5}Al_{0.5}Ti_{1.5}(PO_4)_3$) was used as the inorganic solid particles, and polyvinyl butyral was used as the polymeric material. The softening point of polyvinyl butyral was 120° C. In the slurry, the mass ratio of the inorganic solid particles to the polymeric material was set to 88:12. This slurry was applied onto one principal surface of the substrate layer by a doctor blade method, and the obtained coating film was dried at a temperature of 120° C. In this manner, a composite membrane precursor in which a coating film was provided on the substrate layer was obtained.

Next, this composite membrane precursor was subjected to a roll-press treatment. At the time of the roll-press treatment, a press apparatus equipped with two rollers respectively on upper portions and lower portions was used. The heating temperature of the roller was set to 130° C., and the pressing pressure of each roller was set to 10 kN. Thus was obtained a composite membrane having a composite layer provided on one principal surface.

Subsequently, a negative electrode mixture layer (negative electrode active material-containing layer) was formed on the composite layer surface of the composite membrane. A negative electrode active material, electro-conductive agent, binder, and solvent were mixed to prepare a slurry for negative electrode formation. As the negative electrode active material, $Li_4Ti_5O_{12}$ was used. As the electro-conductive agent, graphite powder was used. As the binder, polyvinyl butyral was used. As the solvent, N-methyl-2-pyrrolidone (NMP) was used. The mass ratios of the negative electrode active material, the electro-conductive agent, and the binder in the slurry was set to 100:5:1. This slurry was applied onto the composite layer surface of the composite membrane and dried at 120° C. to provide a coating film of the negative electrode mixture. A stack of the composite membrane and the coating film of the negative electrode mixture was subjected to roll press treatment to obtain a conjugate of the composite membrane and the negative electrode mixture layer (hereinafter, composite membrane-negative electrode mixture layer conjugate). The temperature of the roller was set to room temperature (25° C.) and the pressing pressure was set to 5 kN.

The obtained composite membrane-negative electrode mixture layer conjugate was immersed into an aqueous electrolyte prepared separately to impregnate the aqueous electrolyte into the conjugate. The aqueous electrolyte was prepared by mixing an electrolyte salt and water. As the electrolyte salt, lithium chloride was used. The concentration of the electrolyte salt in the aqueous electrolyte was set to 10 mol/L. The composite membrane-negative electrode mixture layer conjugate was rolled into a roll and put into the aqueous electrolyte for 30 minutes at room temperature and under reduced pressure, then taken out, and thereafter, the roll surface was wiped, thereby obtaining a composite membrane-negative electrode mixture layer conjugate into which the electrolytic solution was impregnated.

Thereafter, a 50 μm Zn foil was set on the negative electrode mixture layer surface, and subjected to the roll press treatment again. The temperature of the roller was set to room temperature (25° C.) and the pressing pressure was set to 5 kN. Thereby, an electrode construct in which the current collecting foil (current collecting layer), the negative electrode mixture layer, and the composite membrane were integrated was obtained.

For the electrode construct obtained, the peel strength σ1 at the negative electrode mixture layer-composite membrane interface (the first interface between the active material-containing layer and the composite layer) and the peel strength σ2 at the current collecting foil-negative electrode mixture layer interface (the second interface between the current collecting layer and the active material-containing layer) were evaluated by the aforementioned surface/interface cutting method. For the electrode construct produced in Example 1, the peel strength σ1 at the first interface was 7 N/cm, and the peel strength σ2 at the second interface was 0.9 N/cm. Of the profile of the peel strength σ1 measured for the 1 mm length after the horizontal force was constant upon the SAICAS measurement at the first interface, 0% region exhibited diminishment of 100% or more from the average peel strength. Further, the current collecting foil (Zn foil) was separated to obtain a composite membrane-negative electrode mixture layer conjugate, and the coefficient of air permeability of the conjugate was evaluated by the aforementioned method. The coefficient of air permeability was $1.5 \times 10^{-17}$ m$^2$.

<Production of Secondary Battery>

A secondary battery was produced using a positive electrode prepared by the following method and the aqueous electrolyte, in addition to the electrode construct obtained.

[Production of Positive Electrode]

A positive electrode active material, an electro-conductive agent, a binder, and a solvent were mixed together to prepare a slurry for positive electrode fabrication. $LiMn_2O_4$ was used as the positive electrode active material. Graphite powder was used as the electro-conductive agent. Polyvinylidene fluoride (PVdF) was used as the binder. N-methyl-2-pyrrolidone (NMP) was used as the solvent. The mass ratio of the positive electrode active material, electro-conductive agent, and binder in the slurry was set to 80:10:10. This slurry was applied onto both surfaces of a positive electrode current collector, dried, and then subjected to a press treatment, whereby a positive electrode was obtained. A Ti foil having a thickness of 12 μm was used as the positive electrode current collector.

[Production of Electrode Group]

The positive electrode and the electrode construct were stacked to obtain a stack. At this time, the electrode construct was disposed so that the composite membrane surface was positioned on the positive electrode side. The stack was spirally wound so that the negative electrode side was positioned at the outermost periphery, and then pressed to produce a flat electrode group.

[Assembly of Battery]

The obtained electrode group was housed in a metal can, and the aqueous electrolyte prepared in a manner similar to that impregnated into the composite membrane-negative electrode mixture layer conjugate was put in, to produce a secondary battery.

Example 2

<Production of Electrode Construct>

An electrode construct was produced by a method similar to that in Example 1 except that the temperature of the roller in producing the composite membrane was changed to room temperature (25° C.). For Example 2, as in Example 1, the peel strength σ1 at the first interface and the peel strength σ2 at the second interface were evaluated, whereupon σ1 was 9 N/cm, and σ2 was 0.9 N/cm. Of the profile of the peel strength σ1, the proportion of the region exhibiting diminishment of 100% or more from the average peel strength was 2%. Further, for Example 2, the coefficient of air permeability of the conjugate of the composite membrane and the negative electrode mixture layer was evaluated, whereupon the coefficient of air permeability was $9 \times 10^{-16}$ m$^2$.

<Production of Secondary Battery>

A secondary battery was produced according to a procedure similar to that in Example 1 except that the obtained electrode construct was used instead of the electrode construct obtained in Example 1.

Example 3

An electrode construct was produced by a method similar to that in Example 1 except that the mass ratio of the inorganic solid particles to the polymeric material in the slurry used to produce the composite membrane was changed to 97:3. The same evaluations as that in Example 1 were conducted, whereupon σ1 was 1.5 N/cm, and σ2 was 0.9 N/cm. Of the profile of the peel strength σ1, the proportion of the region exhibiting diminishment of 100% or more from the average peel strength was 9%. The coefficient of air permeability of the conjugate was $5 \times 10^{-16}$ m$^2$.

<Production of Secondary Battery>

A secondary battery was produced according to a procedure similar to that in Example 1 except that the obtained electrode construct was used instead of the electrode construct obtained in Example 1.

Example 4

An electrode construct was produced by a method similar to that in Example 1 except that alumina (Al$_2$O$_3$) was used instead of LATP. In Example 4, σ1 was 7 N/cm, and σ2 was 0.9 N/cm. Of the profile of the peel strength σ1, the proportion of the region exhibiting diminishment of 100% or more from the average peel strength was 5%. The coefficient of air permeability of the conjugate was $5 \times 10^{-17}$ m$^2$.

<Production of Secondary Battery>

A secondary battery was produced according to a procedure similar to that in Example 1 except that the obtained electrode construct was used instead of the electrode construct obtained in Example 1.

Example 5

A composite membrane-negative electrode mixture layer conjugate was produced by a method similar to that in Example 1, and an aqueous electrolyte was impregnated into the conjugate. A current collecting foil (Zn foil) was set on the negative electrode mixture layer side (with no roll pressing) when the electrode group was configured at the time of assembling the battery to perform the later described evaluation of the secondary battery. The peel strength σ1 evaluated for the conjugate was 7 N/cm, and the coefficient of air permeability was $1.5 \times 10^{-17}$ m$^2$. Here, the current collecting foil is merely placed on the negative electrode mixture layer, and the current collecting foil and the negative electrode mixture layer are not bonded. For this reason, the peel strength σ2 at the second interface is deemed to be zero. Of the profile of the peel strength σ1, the proportion of the region exhibiting diminishment of 100% or more from the average peel strength was 0%.

<Production of Secondary Battery>

A positive electrode was produced by a method similar to that in Example 1. For a negative electrode current collector, a 50 μm Zn foil was prepared. A stack was obtained by stacking the negative electrode current collector (current collecting foil), the composite membrane-negative electrode mixture layer conjugate, and the positive electrode in the following manner. The composite membrane-negative electrode mixture layer conjugates were overlaid on both sides of the current collecting foil so that the current collecting foil and each of the negative electrode mixture layers were in contact with each other. The positive electrode was further overlaid thereon. The stack was spirally wound so that the negative electrode side was located at the outermost periphery, and then pressed to produce a flat electrode group.

A secondary battery was produced according to a procedure similar to that in Example 1 except that the obtained electrode group was used instead of the electrode group obtained in Example 1.

Tables 1 to 5 list the compositions and production conditions of the electrode constructs of Examples 1 to 5. Table 6 lists the evaluation results according to the surface/interface cutting method (SAICAS method) obtained for the electrode constructs produced in Examples 1 to 5 and the evaluation results of the coefficient of air permeability of the composite membrane-negative electrode conjugates. Specifically, Table 1 lists the composition of the separators (composite membranes), and Table 2 lists the production conditions of the separators (composite membranes). For the separator composition, the table lists the material used for the substrate layer along with thickness thereof, and the inorganic solid particles and polymeric materials used for the material of the composite layer, along with mass ratios thereof. For the separator production conditions, the table lists the drying temperature and application speed of the slurry for composite layer formation, as well as the roller heating temperature and pressing pressure for roll press treatment. Tables 3 and 4 respectively list the compositions and the production conditions of the negative electrode mixture layers. For the negative electrode mixture layer compositions, the table lists the materials used as the negative electrode active material, electro-conductive agent, and binder, together with the mass ratios thereof. For the negative electrode mixture layer production conditions, the table lists the drying temperature and application speed of the slurry for negative electrode mixture layer formation, as well as the roller heating temperature and pressing pressure for roll press treatment. Table 5 list the procedure for production of the electrode constructs, and the pressing temperature and pressing pressure of roll pressing performed last when the electrode constructs were produced. As the evaluation results according to the SAICAS method, Table 6 lists the peel strength σ1 at the first interface between the negative electrode mixture layer and the composite membrane (average peel strength at the first interface), the peel strength σ2 at the second interface between the current collecting foil and the negative electrode mixture layer (average peel strength at the second interface), and the proportion taken-up by the region exhibiting diminishment of 100% or more with respect to the average peel strength in the profile of the peel strength σ1 at the first interface, i.e., the region in which the deviation to the negative direction from the average strength is 100% or more. Table 6 also shows the coefficient of air permeability obtained for the composite membrane-negative electrode mixture layer conjugates.

TABLE 1

| | Separator Composition | | |
|---|---|---|---|
| | Substrate Layer/ Thickness | Inorganic Solid Particle (Mass Ratio) | Polymeric Material (Mass Ratio) |
| Example 1 | cellulose-based nonwoven fabric/15 μm | Li$_{1.5}$Al$_{0.5}$Ti$_{1.5}$(PO$_4$)$_3$ (88) | polyvinyl butyral (12) |
| Example 2 | cellulose-based nonwoven fabric/15 μm | Li$_{1.5}$Al$_{0.5}$Ti$_{1.5}$(PO$_4$)$_3$ (88) | polyvinyl butyral (12) |
| Example 3 | cellulose-based nonwoven fabric/15 μm | Li$_{1.5}$Al$_{0.5}$Ti$_{1.5}$(PO$_4$)$_3$ (97) | polyvinyl butyral (3) |

TABLE 1-continued

| | Separator Composition | | |
|---|---|---|---|
| | Substrate Layer/ Thickness | Inorganic Solid Particle (Mass Ratio) | Polymeric Material (Mass Ratio) |
| Example 4 | cellulose-based nonwoven fabric/15 μm | $Al_2O_3$ (88) | polyvinyl butyral (12) |
| Example 5 | cellulose-based nonwoven fabric/15 μm | $Li_{1.5}Al_{0.5}Ti_{1.5}(PO_4)_3$ (88) | polyvinyl buyral (12) |

TABLE 2

Separator Production Conditions

| | Slurry Drying Temperature (° C.) | Slurry Application Speed (m/min) | Roller Heating Temperature (° C.) | Pressing Pressure (kN) |
|---|---|---|---|---|
| Example 1 | 120 | 0.5 | 130 | 10 |
| Example 2 | 120 | 0.5 | 25 | 10 |
| Example 3 | 120 | 0.5 | 130 | 10 |
| Example 4 | 120 | 0.5 | 130 | 10 |
| Example 5 | 120 | 0.5 | 130 | 10 |

TABLE 3

Negative Electrode Mixture Layer Composition

| | Negative Electrode Active Material (mass ratio) | Electro-conductive Agent (mass ratio) | Binder (mass ratio) |
|---|---|---|---|
| Example 1 | $Li_4Ti_5O_{12}$ (100) | graphite powder (5) | polyvinyl butyral (1) |
| Example 2 | $Li_4Ti_5O_{12}$ (100) | graphite powder (5) | polyvinyl butyral (1) |
| Example 3 | $Li_4Ti_5O_{12}$ (100) | graphite powder (5) | polyvinyl butyral (1) |
| Example 4 | $Li_4Ti_5O_{12}$ (100) | graphite powder (5) | polyvinyl butyral (1) |
| Example 5 | $Li_4Ti_5O_{12}$ (100) | graphite powder (5) | polyvinyl butyral (1) |

TABLE 4

Production Conditions of Negative Electrode Mixture Layer

| | Slurry Drying Temperature (° C.) | Slurry Application Speed (m/min) | Mixture Coating Film Pressing Temperature (° C.) | Mixture Coating Film Pressing Pressure (kN) |
|---|---|---|---|---|
| Example 1 | 120 | 1 | 25 | 5 |
| Example 2 | 120 | 1 | 25 | 5 |
| Example 3 | 120 | 1 | 25 | 5 |
| Example 4 | 120 | 1 | 25 | 5 |
| Example 5 | 120 | 1 | (no press) | (no press) |

TABLE 5

Production Conditions of Electrode Construct

| | Procedure for Production* | Pressing Temperature (° C.) | Pressing Pressure (kN) |
|---|---|---|---|
| Example 1 | Procedure E1 | 25 | 5 |
| Example 2 | Procedure E1 | 25 | 5 |
| Example 3 | Procedure E1 | 25 | 5 |
| Example 4 | Procedure E1 | 25 | 5 |
| Example 5 | Procedure E1, however, without roll-pressing again after setting current collector foil | — | (no press) |

*Procedure E1:
A separator including a composite membrane was produced. Subsequently, a negative electrode mixture layer was formed by application of a mixture slurry onto the composite membrane surface. After impregnating the electrolyte into the negative electrode mixture layer, a current collector foil was set on the negative electrode mixture layer and pressing was performed.

TABLE 6

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate (m²) |
|---|---|---|---|---|
| Example 1 | 7 | 0.9 | 0 | $1.5 \times 10^{-17}$ |
| Example 2 | 9 | 0.9 | 2 | $9 \times 10^{-16}$ |
| Example 3 | 1.5 | 0.9 | 9 | $5 \times 10^{-16}$ |
| Example 4 | 7 | 0.9 | 5 | $5 \times 10^{-17}$ |
| Example 5 | 7 | 0 | 0 | $1.5 \times 10^{-17}$ |

As shown in Table 6, by adopting the production procedure shown in Table 5, obtained in Examples 1 to 5 were electrode constructs in which the peel strength σ1 at the first interface was greater than the peel strength σ2 at the second interface, and the peel strength σ2 was 1 N/cm or less. Further, for the electrode constructs obtained in Examples 1 to 5, the proportion taken-up by the region exhibiting diminishment of 100% or more with respect to the average peel strength in the SAICAS profile of the peel strength σ1 at the first interface was kept to 10% or less. According to these results, it is determined that the electrode constructs had good adhesion at the first interface, causing no crimpling or the like. Further, Examples 1 to 5 exhibited the coefficient of air permeability of the composite membrane-negative electrode mixture layer conjugate of $1 \times 10^{-15}$ m² or less. This shows that dense composite membranes were obtained.

Comparative Example 1

<Production of Negative Electrode>

A slurry for negative electrode formation similar to that in Example 1 was prepared. This slurry was applied onto both principal surfaces of a Zn foil having a thickness of 50 μm and dried at 120° C. to provide a coating film of the negative electrode mixture. A stack of the Zn foil (current collecting foil) and the coating films of the negative electrode mixture was subjected to the roll press treatment to produce a negative electrode including the current collecting foil and negative electrode mixture layers. The temperature of the roller was set to room temperature (25° C.) and the pressing pressure was set to 10 kN.

When evaluating a secondary battery as described below, a composite membrane as a separator and a positive electrode produced according to a procedure similar to that in Example 1 were prepared, and with the composite membrane and positive electrode, as well as the aforementioned negative electrode, an electrode group was formed. In the electrode group, while the surface of the composite layer was in contact with the surface of the negative electrode mixture layer, these members were not bonded. Therefore, the peel strength σ1 at the first interface is deemed to be zero. Further, because no composite membrane-negative electrode mixture layer conjugate was formed, a coefficient of air permeability thereof was not measured. The peel strength σ2 at the second interface between the current collecting foil and the negative electrode mixture layer was 10 N/cm.

<Fabrication of Secondary Battery>

In addition to the obtained negative electrode, a composite membrane similar to that in Example 1 was prepared as a first separator and a second separator. Further, a positive electrode and an aqueous electrolyte similar to those in Example 1 were prepared.

The positive electrode, composite membrane (first separator), negative electrode, and composite membrane (second separator) were stacked in this order to obtain a stack. At this time, the composite membranes were arranged so that the composite layers were positioned on the negative electrode side and the substrate layers were positioned on the positive electrode side. The stack was spirally wound so that the negative electrode was positioned at the outermost periphery, and then pressed, whereby a flat electrode group was fabricated.

A secondary battery was fabricated according to a procedure similar to that in Example 1 except that the obtained electrode group was used instead of the electrode group obtained in Example 1.

Comparative Example 2

<Fabrication of Secondary Battery>

A negative electrode similar to that in Comparative Example 1 was prepared. A composite membrane (separator) similar to that in Example 2 was prepared. A secondary battery was fabricated according to a procedure similar to that in Comparative Example 1 except that the negative electrode and the composite membrane were replaced with these prepared negative electrode and composite membrane.

Comparative Example 3

<Production of Electrode Construct>

A negative electrode was produced by a method similar to that in Comparative Example 1.

Subsequently, composite layers were formed on surfaces of the negative electrode mixture layers of the negative electrode. A slurry for composite layer formation similar to that in Example 1 was prepared. Application, drying and roll press treatment were performed under similar conditions to those in formation of the composite membrane in Example 1, except that the slurry was applied onto the surface of the negative electrode mixture layers instead of the substrate layer. Thereby, an electrode construct in which the current collecting foil, the negative electrode mixture layers, and the composite layers were integrated was obtained.

For the obtained electrode construct, the peel strengths σ1 and σ2 were evaluated, whereupon in Comparative Example 3, σ1 was 9 N/cm, and σ2 was 10 N/cm. Of the profile of the peel strength σ1, the proportion of the region exhibiting diminishment of 100% or more from the average peel strength was 0%. In the electrode construct of Comparative Example 3, because it was difficult to peel off the current collector without fracture, a coefficient of air permeability of the conjugates of the composite layer and the negative electrode mixture layer was not measured.

<Fabrication of Secondary Battery>

The obtained electrode construct was immersed into an aqueous electrolyte similar to that in Example 1. A secondary battery was fabricated according to a procedure similar to that in Example 1 except that this electrode construct was used instead of the electrode construct obtained in Example 1.

Comparative Example 4

A slurry for composite layer formation similar to that in Example 1 was prepared. $Li_4Ti_5O_{12}$ particles were covered using the slurry, thereby producing $Li_4Ti_5O_{12}$ particles (LTO particles) preliminary covered with a composite coating. A negative electrode was produced by a method similar to that in Comparative Example 1 except that the LTO particles were used as the negative electrode active material instead of $Li_4Ti_5O_{12}$ particles with no coating.

In Comparative Example 4, the composite membrane was not included; thus, the peel strength σ1 at the first interface between the negative electrode mixture layer and the composite membrane and the coefficient of air permeability of the composite membrane-negative electrode mixture layer conjugate could not be evaluated. The peel strength σ2 was 12 N/cm.

<Fabrication of Secondary Battery>

In addition to the obtained negative electrode, a positive electrode and an aqueous electrolyte similar to those in Example 1 were prepared. As a separator, a cellulose-based nonwoven fabric having a thickness of 15 μm was used.

A stack was obtained by stacking the positive electrode, the separator, the negative electrode, and the separator in this order. The stack was spirally wound so that the negative electrode was located at the outermost periphery, and then pressed to fabricate a flat electrode group.

A secondary battery was produced according to a procedure similar to that in Example 1 except that the obtained electrode group was used instead of the electrode group obtained in Example 1.

Tables 7 to 11 list the compositions and production conditions of the electrode constructs of Comparative Examples 1 to 4. Table 12 lists the evaluation results according to the SAICAS method performed in Comparative Examples 1 to 4. As described above, the coefficient of air permeability of the composite membrane-negative electrode mixture layer conjugate could not be evaluated in Comparative Examples 1 to 4; thus, "-" is noted under the corresponding items in Table 12. Tables 7 to 12 list items corresponding to or similar to those listed in Tables 1 to 6 for Examples 1 to 5. For Comparative Example 4 using the cellulose-based nonwoven fabric alone as a separator, for example, Table 7 lists the cellulose-based nonwoven fabric under the item of the substrate layer, and "(none)" under the items of the inorganic solid particles and the polymeric material as the constituent materials of the composite layer. Further, because no composite layer was produced in Comparative Example 4, Table 8 notes "-" (i.e., "not applicable") for each production condition. As described above, in Comparative Examples 1 and 2, the composite layer and the negative electrode mixture layer are not bonded, therefore the peel strength σ1 at the first interface is deemed to be zero, and Table 12 notes the value of σ1 as 0 N/cm for the sake of convenience.

TABLE 7

Separator Composition

| | Substrate Layer/ Thickness | Inorganic Solid Particle (mass ratio) | Polymeric Material (mass ratio) |
|---|---|---|---|
| Comparative Example 1 | cellulose-based nonwoven fabric/15 μm | $Li_{1.5}Al_{0.5}Ti_{1.5}(PO_4)_3$ (88) | polyvinyl butyral (12) |
| Comparative Example 2 | cellulose-based nonwoven fabric/15 μm | $Li_{1.5}Al_{0.5}Ti_{1.5}(PO_4)_3$ (88) | polyvinyl butyral (12) |
| Comparative Example 3 | (none) | $Li_{1.5}Al_{0.5}Ti_{1.5}(PO_4)_3$ (88) | polyvinyl butyral (12) |
| Comparative Example 4 | cellulose-based nonwoven fabric/15 μm | (none) | (none) |

TABLE 8

Separator Production Conditions

| | Slurry Drying Temperature (° C.) | Slurry Application Speed (m/min) | Roller Heating Temperature (° C.) | Pressing Pressure (kN) |
|---|---|---|---|---|
| Comparative Example 1 | 120 | 0.5 | 130 | 10 |
| Comparative Example 2 | 120 | 0.5 | 25 | 10 |
| Comparative Example 3 | 120 | 0.5 | 130 | 10 |
| Comparative Example 4 | — | — | — | — |

TABLE 9

Negative Electrode Mixture Layer Composition

| | Negative Electrode Active Material (mass ratio) | Electro-conductive Agent (mass ratio) | Binder (mass ratio) |
|---|---|---|---|
| Comparative Example 1 | $Li_4Ti_5O_{12}$ (100) | graphite powder (5) | polyvinyl butyral (1) |
| Comparative Example 2 | $Li_4Ti_5O_{12}$ (100) | graphite powder (5) | polyvinyl butyral (1) |
| Comparative Example 3 | $Li_4Ti_5O_{12}$ (100) | graphite powder (5) | polyvinyl butyral (1) |
| Comparative Example 4 | $Li_4Ti_5O_{12}$ particle coated with composite coat (100) | graphite powder (5) | polyvinyl butyral (1) |

TABLE 10

Production Conditions of Negative Electrode Mixture Layer

| | Slurry Drying Temperature (° C.) | Slurry Application Speed (m/min) | Mixture Coating Film Pressing Temperature (° C.) | Mixture Coating Film Pressing Pressure (kN) |
|---|---|---|---|---|
| Comparative Example 1 | 120 | 1 | 25 | 10 |
| Comparative Example 2 | 120 | 1 | 25 | 10 |
| Comparative Example 3 | 120 | 1 | 25 | 10 |
| Comparative Example 4 | 120 | 1 | 25 | 10 |

TABLE 11

Production Conditions for Electrode Construct or Stack Including Electrode and Separator

| | Procedures of Production | Pressing Temperature (° C.) | Pressing Pressure (kN) |
|---|---|---|---|
| Comparative Example 1 | Negative electrode mixture layers were formed by application of mixture slurry onto current collector, and separately produced separators including a composite membrane were overlaid on the negative electrode mixture layers. | 25 | (no press) |
| Comparative Example 2 | Negative electrode mixture layers were formed by application of mixture slurry onto current collector, and separately produced separators including a composite membrane were overlaid on the negative electrode mixture layers. | 25 | (no press) |
| Comparative Example 3 | Negative electrode mixture layers were formed by application of mixture slurry onto current collector, and composite layers were formed by application of composite materials onto the negative electrode mixture layers. | 25 | 10 |
| Comparative Example 4 | A mixture slurry was prepared using active material particles covered with a composite membrane in advance, and negative electrode mixture layers were formed by application of the mixture slurry onto current collector, and separators were overlaid on the negative electrode mixture layers. | 25 | (no press) |

TABLE 12

|  | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate (m²) |
|---|---|---|---|---|
| Comparative Example 1 | 0 | 10 | — | — |
| Comparative Example 2 | 0 | 10 | — | — |
| Comparative Example 3 | 9 | 10 | 0 | — |
| Comparative Example 4 | — | 12 | — | — |

As shown in Table 12, by adopting the production procedures shown in Table 11, obtained in Comparative Examples 1 to 4 were the electrode construct and the stacks of the negative electrode and the separator, in which the peel strength σ2 at the second interface was greater than the peel strength σ1 on the separator side of the negative electrode mixture layer. Further, in Comparative Examples 1 to 4, the peel strength σ2 at the second interface exceeded 1 N/cm.

<Performance Evaluation of Secondary Battery>

Charge-discharge efficiencies were measured for the secondary batteries according to Examples 1 to 5 and Comparative Examples 1 and 2. Specifically, each secondary battery was first charged at a constant current of 5 A in an environment of 25° C. until the battery voltage reached 2.7 V. This state was maintained for 30 minutes. Thereafter, the battery was discharged at a constant current of 5 A until the battery voltage reached 2.1 V. This state was maintained for 30 minutes. This series of operations was taken as one charge and discharge cycle, and was repeated 50 times. For each secondary battery, the discharge capacity and charge capacity of the 50th cycle were measured, and the charge-discharge efficiency (discharge capacity/charge capacity) was calculated using the measured values. Subsequently, the secondary batteries were charged until the battery voltage reached 2.7 V, then a rest period of 24 hours was provided, and thereafter, the charge capacity was measured again, to thereby evaluate the storage performance (charge capacity after 24 hours rest/charge capacity immediately before rest). Results thereof are presented in Table 13 and Table 14.

Table 13 lists the evaluation results of the secondary batteries according to Examples 1 to 5, and Table 14 lists the evaluation results of the secondary batteries according to Comparative Examples 1 to 4. In each table, the column noted as "charge-discharge efficiency (%)" shows the value acquired by dividing the discharge capacity after the 50-cycle test by the charge capacity, obtained as described above. The column noted as "discharge capacity (mAh/g)" shows the discharge capacity at the $50^{th}$ cycle in the 50-cycle test. The column noted as "storage performance (%)" shows the ratio of the charge capacity after the 24-hour rest to the capacity when the battery was fully charged at the $51^{st}$ cycle.

TABLE 13

|  | Charge-discharge Efficiency (%) | Discharge Capacity (mAh/g) | Storage Performance (%) |
|---|---|---|---|
| Example 1 | 94 | 161 | 75 |
| Example 2 | 85 | 160 | 63 |

TABLE 13-continued

|  | Charge-discharge Efficiency (%) | Discharge Capacity (mAh/g) | Storage Performance (%) |
|---|---|---|---|
| Example 3 | 88 | 164 | 69 |
| Example 4 | 89 | 161 | 70 |
| Example 5 | 92 | 160 | 73 |

TABLE 14

|  | Charge-discharge Efficiency (%) | Discharge Capacity (mAh/g) | Storage Performance (%) |
|---|---|---|---|
| Comparative Example 1 | 91 | 160 | 35 |
| Comparative Example 2 | 75 | 161 | 10 |
| Comparative Example 3 | 10 | 27 | 0 |
| Comparative Example 4 | 96 | 136 | 51 |

As is clear from the comparison between Table 13 and Table 14, the storage performances of the secondary batteries using the electrode constructs of Examples 1 to 5 was higher than that of the secondary batteries of Comparative Examples 1 to 4. The difference in performance with respect to Comparative Examples 1, 2 and 4 is considered to be because, in the secondary battery according to Examples 1 to 5, the impact from reductive decomposition by deposited water was gone, as no liquid accumulation occurs at the interface between the negative electrode and the separator (the first interface between the active material-containing layer and the composite layer). In contrast, in Comparative Examples 1, 2 and 4 in which the separator and the negative electrode were merely stacked, liquid accumulation presumably occurred at the interface therebetween. In these comparative examples, it is determined that electrolysis of water occurred when the members constituting the negative electrode had come into contact with water in the liquid accumulation, whereby self-discharge had proceeded. In Comparative Example 4, although the LTO particles (negative electrode active material particles) were covered with the composite coating of the same composition as the material composition used for the composite layers in Examples 1 to 5, the storage performance was low. In Comparative Example 4, electrolysis presumably advanced because graphite powder (electro-conductive agent) had come into contact with the liquid accumulation, even though the LTO particles were water-shielded with the composite coating.

While the SAICAS measurement results of Table 12 show that there was no liquid accumulation in Comparative Example 3, each performance was significantly low in Comparative Example 3. This is presumably because the electrolyte solution could not be impregnated in advance due to the production method adopted for the electrode construct of Comparative Example 3. First, because a water solvent of an aqueous electrolyte is evaporated due to high drying temperature of each slurry for forming the negative electrode mixture layer and the composite layer, the aqueous electrolyte cannot be impregnated until both the negative electrode mixture layer and the composite layer are formed. In Comparative Example 3, at the stage when both the negative electrode mixture layer and the composite layer are present, the current collecting foil is provided on one principal surface of the negative electrode mixture layer, while the composite layer is formed on the other principal surface on the reverse side. Since the liquid cannot be impregnated through the current collecting foil, the aqueous electrolyte cannot be impregnated into the negative electrode mixture layer from the principal surface on the current collecting foil side. While the coefficient of air permeability was not measured in Comparative Example 3 for the above-described reason, since the conditions of forming the composite layer are the same as those in Examples 1 and 3 to 5, it can be determined that the composite layer having at least a certain level of denseness was obtained. It is considered that impregnation of liquid through such a dense composite layer is difficult, and the aqueous electrolyte is hardly impregnated into the negative electrode mixture layer from the principal surface on the composite layer side. It is considered that, in Comparative Example 3, these results lead to the small amount of aqueous electrolyte impregnated into the electrode construct, whereby the battery performance had significantly deteriorated. If a current collector in a mesh form, for example, is used for the purpose of impregnating the electrolyte solution from the current collector side, it is predicted that due to insufficient strength of the current collector, fractures would occur when the roll press treatment is performed under the conditions of forming the dense composite layer.

Examples 6 to 18 below demonstrate the effects by the production conditions of the electrode construct on the peel strengths at the first and second interfaces and the coefficient of air permeability of the composite membrane-negative electrode mixture layer conjugate.

Examples 6 to 18

<Production of Electrode Construct>

In Example 6, an electrode construct was produced by a method similar to that in Example 1 except that the pressing pressure in the roll press treatment after setting the Zn foil on the negative electrode mixture layer surface was changed to 10 kN. In Examples 7 to 18, an electrode construct was produced by a method similar to that in Example 1 except that the production conditions of the composite membrane (separator) and the negative electrode mixture layer were changed as respectively shown in Tables 15 and 16. Table 17 shows the results of evaluating the peel strength σ1 at the first interface and the peel strength σ2 at the second interface, as in Example 1. Table 17 further shows the results of evaluating the coefficient of air permeability of the conjugate of the composite membrane and the negative electrode mixture layer. Tables 15 to 17 list items corresponding to those listed in Tables 1 to 6 for Examples 1 to 5.

TABLE 15

Separator Production Conditions

| | Slurry Drying Temperature (° C.) | Slurry Application Speed (m/min) | Roller Heating Temperature (° C.) | Pressing Pressure (kN) |
|---|---|---|---|---|
| Example 6 | 120 | 0.5 | 130 | 10 |
| Example 7 | 140 | 0.5 | 130 | 10 |
| Example 8 | 120 | 1 | 130 | 10 |
| Example 9 | 120 | 0.2 | 130 | 10 |
| Example 10 | 120 | 0.5 | 110 | 10 |
| Example 11 | 120 | 0.5 | 150 | 10 |
| Example 12 | 120 | 0.5 | 130 | 5 |
| Example 13 | 120 | 0.5 | 130 | 15 |
| Example 14 | 120 | 0.5 | 130 | 10 |

TABLE 15-continued

Separator Production Conditions

| | Slurry Drying Temperature (° C.) | Slurry Application Speed (m/min) | Roller Heating Temperature (° C.) | Pressing Pressure (kN) |
|---|---|---|---|---|
| Example 15 | 120 | 0.5 | 130 | 10 |
| Example 16 | 120 | 0.5 | 130 | 10 |
| Example 17 | 120 | 0.5 | 130 | 10 |
| Example 18 | 120 | 0.5 | 130 | 10 |

*Separator Compositions for Examples 6-18 were the same as that for Example 1, therefore, as follows:

| | | |
|---|---|---|
| Substrate: | cellulose-based nonwoven fabric | (15 μm) |
| Inorganic Solid Particle: | $Li_{1.5}Al_{0.5}Ti_{1.5}(PO_4)_3$ | (mass ratio: 88) |
| Polymeric Material: | polyvinyl butyral | (mass ratio: 12) |

TABLE 16

Production Conditions of Negative Electrode Mixture Layer

| | Slurry Drying Temperature (° C.) | Slurry Application Speed (m/min) | Mixture Coating Film Pressing Temperature (° C.) | Mixture Coating Film Pressing Pressure (kN) |
|---|---|---|---|---|
| Example 6 | 120 | 1 | 25 | 5 |
| Example 7 | 120 | 1 | 25 | 5 |
| Example 8 | 120 | 1 | 25 | 5 |
| Example 9 | 120 | 1 | 25 | 5 |
| Example 10 | 120 | 1 | 25 | 5 |
| Example 11 | 120 | 1 | 25 | 5 |
| Example 12 | 120 | 1 | 25 | 3 |
| Example 13 | 120 | 1 | 25 | 5 |
| Example 14 | 140 | 1 | 25 | 5 |
| Example 15 | 120 | 0.5 | 25 | 5 |
| Example 16 | 120 | 2 | 25 | 5 |
| Example 17 | 120 | 1 | 130 | 5 |
| Example 18 | 120 | 1 | 25 | 10 |

*Negative Electrode Mixture Compositions for Examples 6-18 were the same as that for Example 1, therefore as follows:

| | | |
|---|---|---|
| Negative Electrode Active Material: | $Li_4Ti_5O_{12}$ | (mass ratio: 100) |
| Electro-conductive Agent: | graphite powder | (mass ratio: 5) |
| Binder: | polyvinyl butyral | (mass ratio: 1) |

TABLE 17

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate (m$^2$) |
|---|---|---|---|---|
| Example 6 | 7 | 0.9 | 0 | $1.5 \times 10^{-17}$ |
| Example 7 | 7 | 0.9 | 0 | $1 \times 10^{-17}$ |
| Example 8 | 7 | 0.9 | 5 | $3 \times 10^{-17}$ |
| Example 9 | 7 | 0.9 | 0 | $1 \times 10^{-17}$ |
| Example 10 | 7 | 0.9 | 8 | $8 \times 10^{-17}$ |
| Example 11 | 7 | 0.9 | 0 | $6.5 \times 10^{-17}$ |
| Example 12 | 8 | 0.9 | 9 | $5 \times 10^{-17}$ |
| Example 13 | 4 | 0.9 | 3 | $5 \times 10^{-17}$ |
| Example 14 | 7 | 0.6 | 0 | $1.5 \times 10^{-17}$ |

TABLE 17-continued

|  | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate (m$^2$) |
| --- | --- | --- | --- | --- |
| Example 15 | 7 | 1 | 0 | $1.5 \times 10^{-17}$ |
| Example 16 | 7 | 0.7 | 6 | $1.5 \times 10^{-17}$ |
| Example 17 | 10 | 0.9 | 0 | $8 \times 10^{-18}$ |
| Example 18 | 9 | 1 | 0 | $9 \times 10^{-18}$ |

*Production Conditions of Electrode Construct for Examples 7-18 were the same as that for Example 1, therefore as follows:
For Example 6, same as that for Example 1, except that the Pressing Pressure was 10 kN:

| | |
|---|---|
| Procedures for Producing Electrode Construct: | Procedure E1 described in Table 5 |
| Pressing Temperature: | 25° C. |
| Pressing Pressure: | 5 kN |

<Production of Secondary Battery and Performance Evaluation>

Secondary batteries were produced according to procedures similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 18. Table 18 shows the evaluation results corresponding to the evaluated performances shown in Table 13 for Examples 1 to 5.

TABLE 18

| | Charge-discharge Efficiency (%) | Discharge Capacity (mAh/g) | Storage Performance (%) |
| --- | --- | --- | --- |
| Example 6 | 91 | 160 | 70 |
| Example 7 | 88 | 145 | 68 |
| Example 8 | 85 | 161 | 66 |
| Example 9 | 90 | 148 | 70 |
| Example 10 | 83 | 165 | 61 |
| Example 11 | 90 | 144 | 68 |
| Example 12 | 85 | 160 | 62 |
| Example 13 | 91 | 148 | 71 |
| Example 14 | 90 | 155 | 70 |
| Example 15 | 91 | 158 | 69 |
| Example 16 | 87 | 155 | 65 |
| Example 17 | 79 | 139 | 70 |
| Example 18 | 83 | 145 | 69 |

Examples 19 to 26 below demonstrate examples of using various materials for each member.

Examples 19 to 26

<Production of Electrode Construct>

In Example 19, an electrode construct was produced by a method similar to that in Example 1 except that the composition of the slurry for composite layer formation was changed so that the mass ratio of LATP as the inorganic solid particles was 95 and the mass ratio of polyvinylidene fluoride (PVdF) as the polymeric material was 5, and that the roller heating temperature at the time of forming the composite layer was changed to 25° C. In Examples 20 to 26, electrode constructs were produced by methods similar to that in Example 1 except that the materials used for the composite membrane (separator) and the negative electrode mixture layer were changed as respectively shown in Tables 19 and 20. Table 21 shows the results of evaluating the peel strength σ1 at the first interface and the peel strength σ2 at the second interface, as in Example 1. Table 21 further shows the results of evaluating the coefficient of air permeability of the conjugate of the composite membrane and the negative electrode mixture layer. Tables 19 to 21 list items corresponding to those listed in Tables 1 to 6 for Examples 1 to 5.

TABLE 19

| | Separator Composition | | |
| --- | --- | --- | --- |
| | Substrate Layer/ Thickness | Inorganic Solid Particle (mass ratio) | Polymeric Material (mass ratio) |
| Example 19 | cellulose-based nonwoven fabric/ 15 μm | $Li_{1.5}Al_{0.5}Ti_{1.5}(PO_4)_3$ (95) | PVdF (5) |
| Example 20 | cellulose-based nonwoven fabric/ 15 μm | $Li_{1.5}Al_{0.5}Ti_{1.5}(PO_4)_3$ (88) | polyvinyl butyral (12) |
| Example 21 | cellulose-based nonwoven fabric/ 15 μm | $Li_{1.5}Al_{0.5}Ti_{1.5}(PO_4)_3$ (88) | polyvinyl butyral (12) |
| Example 22 | cellulose-based nonwoven fabric/ 15 μm | $Li_{1.5}Al_{0.5}Ti_{1.5}(PO_4)_3$ (88) | polyvinyl butyral (12) |
| Example 23 | cellulose-based nonwoven fabric/ 15 μm | $Li_7La_3Zr_2O_{12}$ (88) | polyvinyl butyral (12) |
| Example 24 | cellulose-based nonwoven fabric/ 15 μm | $Li_{1.5}Al_{0.5}Ti_{1.5}(PO_4)_3$ (88) | polyvinyl formal (12) |
| Example 25 | cellulose-based nonwoven fabric/ 15 μm | $Li_7La_3Zr_2O_{12}$ (88) | polyvinyl formal (12) |
| Example 26 | PET-based nonwoven fabric/ 15 μm | $Li_7La_3Zr_2O_{12}$ (88) | polyvinyl formal (12) |

*Separator Production Conditions for Examples 20-26 were the same as that in Example 1, Therefore, as follows.
For Example 19, same as that for Example 1, except that the Roller Heating Temperature was 25° C.:

| | |
|---|---|
| Slurry Drying Temperature: | 120° C. |
| Slurry Application Speed: | 0.5 m/min |
| Roller Heating Temperature: | 130° C. |
| Pressing Pressure: | 10 kN |

TABLE 20

| | Negative Electrode Mixture Layer Composition | | |
| --- | --- | --- | --- |
| | Negative Electrode Active Material (mass ratio) | Electro-conductive Agent (mass ratio) | Binder (mass ratio) |
| Example 19 | $Li_4Ti_5O_{12}$ (100) | graphite powder (5) | polyvinyl butyral (1) |
| Example 20 | $TiNb_2O_7$ (100) | graphite powder (5) | polyvinyl butyral (1) |
| Example 21 | $Li_4Ti_5O_{12}$ (100) | graphite powder (5) | PVdF (1) |
| Example 22 | $TiNb_2O_7$ (100) | graphite powder (5) | PVdF (1) |
| Example 23 | $Li_4Ti_5O_{12}$ (100) | graphite powder (5) | polyvinyl butyral (1) |
| Example 24 | $Li_4Ti_5O_{12}$ (100) | graphite powder (5) | polyvinyl butyral (1) |
| Example 25 | $Li_4Ti_5O_{12}$ (100) | graphite powder (5) | polyvinyl butyral (1) |

TABLE 20-continued

| | Negative Electrode Mixture Layer Composition | | |
|---|---|---|---|
| | Negative Electrode Active Material (mass ratio) | Electro-conductive Agent (mass ratio) | Binder (mass ratio) |
| Example 26 | $Li_4Ti_5O_{12}$ (100) | graphite powder (5) | polyvinyl butyral (1) |

*Production Conditions of Negative Electrode Mixture Layer for Examples 19-26 were the same as that for Example 1, therefore as follows:
Slurry Drying Temperature: 120° C.
Slurry Application Speed: 1 m/min
Mixture Coating Film Pressing Temperature: 25° C.
Mixture Coating Film Pressing Pressure: 5 kN

TABLE 21

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate ($m^2$) |
|---|---|---|---|---|
| Example 19 | 15 | 0.9 | 13 | $5 \times 10^{-15}$ |
| Example 20 | 7 | 0.9 | 0 | $1.5 \times 10^{-17}$ |
| Example 21 | 5 | 0.9 | 4 | $1.5 \times 10^{-17}$ |
| Example 22 | 5 | 0.9 | 3 | $1.5 \times 10^{-17}$ |
| Example 23 | 7 | 0.9 | 0 | $1.5 \times 10^{-17}$ |
| Example 24 | 8 | 0.9 | 7 | $3 \times 10^{-17}$ |
| Example 25 | 8 | 0.9 | 8 | $3 \times 10^{-17}$ |
| Example 26 | 8 | 0.9 | 0 | $3 \times 10^{-17}$ |

*Production Conditions of Electrode Construct for Examples 19-26 were the same as that for Example 1, therefore as follows:
Procedures for Producing Electrode Construct: Procedure E1 described in Table 5
Pressing Temperature: 25° C.
Pressing Pressure: 5 kN <Production of Secondary Battery and Performance Evaluation>

Secondary batteries were produced according to procedures similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 22. Table 22 shows the evaluation results corresponding to the evaluated performances shown in Table 13 for Examples 1 to 5.

TABLE 22

| | Charge-discharge Efficiency (%) | Discharge Capacity (mAh/g) | Storage Performance (%) |
|---|---|---|---|
| Example 19 | 75 | 161 | 51 |
| Example 20 | 90 | 258 | 71 |
| Example 21 | 81 | 163 | 61 |
| Example 22 | 82 | 264 | 60 |
| Example 23 | 91 | 161 | 74 |
| Example 24 | 87 | 163 | 71 |
| Example 25 | 86 | 160 | 70 |
| Example 26 | 91 | 162 | 73 |

Examples 27 to 57 below demonstrate, with regard to electrode constructs using various materials for each member, the effects of the production conditions on the peel strengths at the first and second interfaces and the coefficient of air permeability of the composite membrane-negative electrode mixture layer conjugate, for each of the combinations of the materials.

Examples 27 to 33

<Production of Electrode Construct>

An electrode construct was produced by a method similar to that in Example 1 except that the materials used for the composite membrane (separator) and the negative electrode mixture layer and the production conditions of each member were changed as respectively shown in Tables 23 and 24. Table 25 shows the results of evaluating the peel strength σ1 at the first interface and the peel strength σ2 at the second interface, as in Example 1. Table 25 further shows the results of evaluating the coefficient of air permeability of the conjugate of the composite membrane and the negative electrode mixture layer. Tables 23 to 25 list items corresponding to those listed in Tables 1 to 6 for Examples 1 to 5.

TABLE 23

| | Separator Production Conditions | | | |
|---|---|---|---|---|
| | Slurry Drying Temperature (° C.) | Slurry Application Speed (m/min) | Roller Heating Temperature (° C.) | Pressing Pressure (kN) |
| Example 27 | 140 | 0.5 | 130 | 10 |
| Example 28 | 120 | 1 | 130 | 10 |
| Example 29 | 120 | 0.5 | 110 | 10 |
| Example 30 | 120 | 0.5 | 130 | 5 |
| Example 31 | 120 | 0.5 | 130 | 10 |
| Example 32 | 120 | 0.5 | 130 | 10 |
| Example 33 | 120 | 0.5 | 130 | 10 |

*Separator Compositions for Examples 27-33 were the same as that for Example 23, therefore, as follows:
Substrate: cellulose nonwoven fabric (15 μm)
Inorganic Solid Particle: $Li_7La_3Zr_2O_{12}$ (mass ratio: 88)
Polymeric Material: polyvinyl butyral (mass ratio: 12)

TABLE 24

| | Production Conditions of Negative Electrode Mixture Layer | | | |
|---|---|---|---|---|
| | Slurry Drying Temperature (° C.) | Slurry Application Speed (m/min) | Mixture Coat Pressing Temperature (° C.) | Mixture Coat Pressing Pressure (kN) |
| Example 27 | 120 | 1 | 25 | 5 |
| Example 28 | 120 | 1 | 25 | 5 |
| Example 29 | 120 | 1 | 25 | 5 |
| Example 30 | 120 | 1 | 25 | 5 |

TABLE 24-continued

<table>
<tr><th colspan="5">Production Conditions of<br>Negative Electrode Mixture Layer</th></tr>
<tr><th></th><th>Slurry<br>Drying<br>Temperature<br>(° C.)</th><th>Slurry<br>Application<br>Speed<br>(m/min)</th><th>Mixture Coat<br>Pressing<br>Temperature<br>(° C.)</th><th>Mixture Coat<br>Pressing<br>Pressure<br>(kN)</th></tr>
<tr><td>Example 31</td><td>140</td><td>1</td><td>25</td><td>5</td></tr>
<tr><td>Example 32</td><td>120</td><td>0.5</td><td>25</td><td>5</td></tr>
<tr><td>Example 33</td><td>120</td><td>1</td><td>130</td><td>5</td></tr>
</table>

*Negative Electrode Mixture Compositions for Examples 27-33 were the same as that for Example 1, therefore as follows:

| | | |
|---|---|---|
| Negative Electrode Active Material: | $Li_4Ti_5O_{12}$ | (mass ratio: 100) |
| Electro-conductive Agent: | graphite powder | (mass ratio: 5) |
| Binder: | polyvinyl butyral | (mass ratio: 1) |

TABLE 25

<table>
<tr><th></th><th>σ1<br>(N/cm)</th><th>σ2<br>(N/cm)</th><th>Proportion Taken-up<br>by Region Exhibiting<br>Diminishment of<br>100% or More<br>With Respect to<br>the Average Peel<br>Strength in<br>SAICAS Profile<br>(%)</th><th>Coefficient<br>of Air<br>Permeability<br>of Conjugate<br>($m^2$)</th></tr>
<tr><td>Example 27</td><td>7</td><td>0.9</td><td>0</td><td>$1 \times 10^{-17}$</td></tr>
<tr><td>Example 28</td><td>7</td><td>0.9</td><td>3</td><td>$3 \times 10^{-17}$</td></tr>
<tr><td>Example 29</td><td>7</td><td>0.9</td><td>8</td><td>$8 \times 10^{-17}$</td></tr>
<tr><td>Example 30</td><td>8</td><td>0.9</td><td>9</td><td>$5 \times 10^{-17}$</td></tr>
<tr><td>Example 31</td><td>7</td><td>0.6</td><td>0</td><td>$1.5 \times 10^{-17}$</td></tr>
<tr><td>Example 32</td><td>7</td><td>1</td><td>0</td><td>$1.5 \times 10^{-17}$</td></tr>
<tr><td>Example 33</td><td>10</td><td>0.9</td><td>0</td><td>$8 \times 10^{-18}$</td></tr>
</table>

*Production Conditions of Electrode Construct for Examples 27-33 were the same as that for Example 1, therefore as follows:

| | |
|---|---|
| Procedures for Producing Electrode Construct: | Procedure E1 described in Table 5 |
| Pressing Temperature: | 25° C. |
| Pressing Pressure: | 5 kN |

<Production of Secondary Battery and Performance Evaluation>

Secondary batteries were produced according to a procedure similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 26. Table 26 shows the evaluation results corresponding to the evaluated performances shown in Table 13 for Examples 1 to 5.

TABLE 26

| | Charge-discharge<br>Efficiency<br>(%) | Discharge<br>Capacity<br>mAh/g | Storage<br>Performance<br>(%) |
|---|---|---|---|
| Example 27 | 88 | 146 | 67 |
| Example 28 | 83 | 160 | 66 |
| Example 29 | 84 | 164 | 60 |
| Example 30 | 85 | 161 | 63 |
| Example 31 | 91 | 160 | 71 |
| Example 32 | 91 | 159 | 70 |
| Example 33 | 82 | 135 | 71 |

Examples 34 to 41

<Production of Electrode Construct>

Electrode constructs were produced by a method similar to that in Example 1 except that the materials used for the composite membrane (separator) and the negative electrode mixture layer and the production conditions of each member were changed as respectively shown in Tables 27 and 28. Table 29 shows results of evaluating the peel strength σ1 at the first interface and the peel strength σ2 at the second interface, as in Example 1. Table 29 further shows the results of evaluating the coefficient of air permeability of the conjugate of the composite membrane and the negative electrode mixture layer. Tables 27 to 29 list items corresponding to those listed in Tables 1 to 6 for Examples 1 to 5.

TABLE 27

<table>
<tr><th colspan="5">Separator Production Conditions</th></tr>
<tr><th></th><th>Slurry<br>Drying<br>Temperature<br>(° C.)</th><th>Slurry<br>Application<br>Speed<br>(m/min)</th><th>Roller<br>Heating<br>Temperature<br>(° C.)</th><th>Pressing<br>Pressure<br>(kN)</th></tr>
<tr><td>Example 34</td><td>140</td><td>0.5</td><td>130</td><td>10</td></tr>
<tr><td>Example 35</td><td>120</td><td>1</td><td>130</td><td>10</td></tr>
<tr><td>Example 36</td><td>120</td><td>0.5</td><td>110</td><td>10</td></tr>
<tr><td>Example 37</td><td>120</td><td>0.5</td><td>130</td><td>5</td></tr>
<tr><td>Example 38</td><td>120</td><td>0.5</td><td>130</td><td>10</td></tr>
<tr><td>Example 39</td><td>120</td><td>0.5</td><td>130</td><td>10</td></tr>
<tr><td>Example 40</td><td>120</td><td>0.5</td><td>130</td><td>10</td></tr>
<tr><td>Example 41</td><td>120</td><td>0.5</td><td>130</td><td>10</td></tr>
</table>

*Separator Compositions for Examples 34-41 were the same as that for Example 24, therefore, as follows:

| | | |
|---|---|---|
| Substrate: | cellulose-based nonwoven fabric | (15 μm) |
| Inorganic Solid Particle: | $Li_{1.5}Al_{0.5}Ti_{1.5}(PO_4)_3$ | (mass ratio: 88) |
| Polymeric Material: | polyvinyl formal | (mass ratio: 12) |

TABLE 28

<table>
<tr><th colspan="5">Production Conditions of<br>Negative Electrode Mixture Layer</th></tr>
<tr><th></th><th>Slurry<br>Drying<br>Temperature<br>(° C.)</th><th>Slurry<br>Application<br>Speed<br>(m/min)</th><th>Mixture<br>Coating Film<br>Pressing<br>Temperature<br>(° C.)</th><th>Mixture<br>Coating Film<br>Pressing<br>Pressure<br>(kN)</th></tr>
<tr><td>Example 34</td><td>120</td><td>1</td><td>25</td><td>5</td></tr>
<tr><td>Example 35</td><td>120</td><td>1</td><td>25</td><td>5</td></tr>
<tr><td>Example 36</td><td>120</td><td>1</td><td>25</td><td>5</td></tr>
<tr><td>Example 37</td><td>120</td><td>1</td><td>25</td><td>5</td></tr>
<tr><td>Example 38</td><td>140</td><td>1</td><td>25</td><td>5</td></tr>
</table>

TABLE 28-continued

| | Production Conditions of Negative Electrode Mixture Layer | | | |
|---|---|---|---|---|
| | Slurry Drying Temperature (° C.) | Slurry Application Speed (m/min) | Mixture Coating Film Pressing Temperature (° C.) | Mixture Coating Film Pressing Pressure (kN) |
| Example 39 | 120 | 0.5 | 25 | 5 |
| Example 40 | 120 | 1 | 130 | 5 |
| Example 41 | 120 | 1 | 25 | 10 |

*Negative Electrode Mixture Compositions for Examples 34-41 were the same as that for Example 1, therefore as follows:

| | | |
|---|---|---|
| Negative Electrode Active Material: | $Li_4Ti_5O_{12}$ | (mass ratio: 100) |
| Electro-conductive Agent: | graphite powder | (mass ratio: 5) |
| Binder: | polyvinyl butyral | (mass ratio: 1) |

TABLE 29

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate ($m^2$) |
|---|---|---|---|---|
| Example 34 | 9 | 0.9 | 0 | $1 \times 10^{-17}$ |
| Example 35 | 8 | 0.9 | 3 | $3 \times 10^{-17}$ |
| Example 36 | 8 | 0.9 | 8 | $8 \times 10^{-17}$ |
| Example 37 | 9 | 0.9 | 8 | $5 \times 10^{-17}$ |
| Example 38 | 8 | 0.6 | 0 | $1.5 \times 10^{-17}$ |
| Example 39 | 7 | 1 | 0 | $1.5 \times 10^{-17}$ |
| Example 40 | 10 | 0.9 | 0 | $8 \times 10^{-18}$ |
| Example 41 | 9 | 1 | 0 | $9 \times 10^{-18}$ |

*Production Conditions of Electrode Construct for Examples 34-41 were the same as that for Example 1, therefore as follows:

| | |
|---|---|
| Procedures for Producing Electrode Construct: | Procedure E1 described in Table 5 |
| Pressing Temperature: | 25° C. |
| Pressing Pressure: | 5 kN |

<Production of Secondary Battery and Performance Evaluation>

Secondary batteries were produced according to procedures similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 30. Table 30 shows the evaluation results corresponding to the evaluated performances shown in Table 13 for Examples 1 to 5.

TABLE 30

| | Charge-discharge Efficiency (%) | Discharge Capacity (mAh/g) | Storage Performance (%) |
|---|---|---|---|
| Example 34 | 90 | 150 | 69 |
| Example 35 | 84 | 162 | 69 |
| Example 36 | 83 | 163 | 61 |
| Example 37 | 87 | 161 | 64 |
| Example 38 | 92 | 161 | 72 |
| Example 39 | 91 | 157 | 71 |
| Example 40 | 84 | 140 | 70 |
| Example 41 | 91 | 160 | 70 |

Examples 42 to 49

<Production of Electrode Construct>

Electrode constructs were produced by a method similar to that in Example 1 except that the materials used for the composite membrane (separator) and the negative electrode mixture layer and the production conditions of each member were changed as respectively shown in Tables 31 and 32. Table 33 shows the results of evaluating the peel strength σ1 at the first interface and the peel strength σ2 at the second interface, as in Example 1. Table 33 further shows the results of evaluating the coefficient of air permeability of the conjugate of the composite membrane and the negative electrode mixture layer. Tables 31 to 33 list items corresponding to those listed in Tables 1 to 6 for Examples 1 to 5.

TABLE 31

| | Separator Production Conditions | | | |
|---|---|---|---|---|
| | Slurry Drying Temperature (° C.) | Slurry Application Speed (m/min) | Roller Heating Temperature (° C.) | Pressing Pressure (kN) |
| Example 42 | 140 | 0.5 | 130 | 10 |
| Example 43 | 120 | 1 | 130 | 10 |
| Example 44 | 120 | 0.5 | 110 | 10 |
| Example 45 | 120 | 0.5 | 130 | 5 |
| Example 46 | 120 | 0.5 | 130 | 10 |
| Example 47 | 120 | 0.5 | 130 | 10 |
| Example 48 | 120 | 0.5 | 130 | 10 |
| Example 49 | 120 | 0.5 | 130 | 10 |

*Separator Compositions for Examples 42-49 were the same as that for Example 24, therefore, as follows:

| | | |
|---|---|---|
| Substrate: | cellulose-based nonwoven fabric | (15 μm) |
| Inorganic Solid Particle: | $Li_{1.5}Al_{0.5}Ti_{1.5}(PO_4)_3$ | (mass ratio: 88) |
| Polymeric Material: | polyvinyl formal | (mass ratio: 12) |

TABLE 32

| | Production Conditions of Negative Electrode Mixture Layer | | | |
|---|---|---|---|---|
| | Slurry Drying Temperature (° C.) | Slurry Application Speed (m/min) | Mixture Coat Pressing Temperature (° C.) | Mixture Coating Film Pressing Pressure (kN) |
| Example 42 | 120 | 1 | 25 | 5 |
| Example 43 | 120 | 1 | 25 | 5 |
| Example 44 | 120 | 1 | 25 | 5 |
| Example 45 | 120 | 1 | 25 | 5 |
| Example 46 | 140 | 1 | 25 | 5 |

TABLE 32-continued

| | Production Conditions of Negative Electrode Mixture Layer | | | |
|---|---|---|---|---|
| | Slurry Drying Temperature (° C.) | Slurry Application Speed (m/min) | Mixture Coat Pressing Temperature (° C.) | Mixture Coating Film Pressing Pressure (kN) |
| Example 47 | 120 | 0.5 | 25 | 5 |
| Example 48 | 120 | 1 | 130 | 5 |
| Example 49 | 120 | 1 | 25 | 10 |

*Negative Electrode Mixture Compositions for Examples 42-49 were the same as that for Example 20, therefore as follows:
Negative Electrode Active Material: $TiNb_2O_7$ (mass ratio: 100)
Electro-conductive Agent: graphite powder (mass ratio: 5)
Binder: polyvinyl butyral (mass ratio: 1)

TABLE 33

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate ($m^2$) |
|---|---|---|---|---|
| Example 42 | 9 | 0.9 | 0 | $1 \times 10^{-17}$ |
| Example 43 | 8 | 0.9 | 2 | $3 \times 10^{-17}$ |
| Example 44 | 8 | 0.9 | 8 | $8 \times 10^{-17}$ |
| Example 45 | 9 | 0.9 | 7 | $5 \times 10^{-17}$ |
| Example 46 | 8 | 0.6 | 0 | $1.5 \times 10^{-17}$ |
| Example 47 | 7 | 1 | 0 | $1.5 \times 10^{-17}$ |
| Example 48 | 10 | 0.9 | 0 | $8 \times 10^{-18}$ |
| Example 49 | 9 | 1 | 0 | $9 \times 10^{-18}$ |

*Production Conditions of Electrode Construct for Examples 42-49 were the same as that for Example 1, therefore as follows:
Procedures for Producing Electrode Construct: Procedure E1 described in Table 5
Pressing Temperature: 25° C.
Pressing Pressure: 5 kN <Production of Secondary Battery and Performance Evaluation>

Secondary batteries were produced according to procedures similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 34. Table 34 shows the evaluation results corresponding to the evaluated performances shown in Table 13 for Examples 1 to 5.

TABLE 34

| | Charge-discharge Efficiency (%) | Discharge Capacity (mAh/g) | Storage Performance (%) |
|---|---|---|---|
| Example 42 | 91 | 261 | 71 |
| Example 43 | 83 | 268 | 70 |
| Example 44 | 85 | 265 | 63 |
| Example 45 | 88 | 266 | 64 |
| Example 46 | 92 | 263 | 72 |
| Example 47 | 90 | 256 | 70 |
| Example 48 | 83 | 236 | 69 |
| Example 49 | 92 | 259 | 71 |

Examples 50 to 57

<Production of Electrode Construct>

Electrode constructs were produced by a method similar to that in Example 1 except that the materials used for the composite membrane (separator) and the negative electrode mixture layer and the production conditions of each member were changed as respectively shown in Tables 35 and 36. Table 37 shows the results of evaluating the peel strength σ1 at the first interface and the peel strength σ2 at the second interface as in Example 1. Table 37 further shows the results of evaluating the coefficient of air permeability of the conjugate of the composite membrane and the negative electrode mixture layer. Tables 35 to 37 list items corresponding to those listed in Tables 1 to 6 for Examples 1 to 5.

TABLE 35

| | Separator Production Conditions | | | |
|---|---|---|---|---|
| | Slurry Drying Temperature (° C.) | Slurry Application Speed (m/min) | Roller Heating Temperature (° C.) | Pressing Pressure (kN) |
| Example 50 | 140 | 0.5 | 130 | 10 |
| Example 51 | 120 | 1 | 130 | 10 |
| Example 52 | 120 | 0.5 | 110 | 10 |
| Example 53 | 120 | 0.5 | 130 | 5 |
| Example 54 | 120 | 0.5 | 130 | 10 |
| Example 55 | 120 | 0.5 | 130 | 10 |
| Example 56 | 120 | 0.5 | 130 | 10 |
| Example 57 | 120 | 0.5 | 130 | 10 |

*Separator Compositions for Examples 50-57 were the same as that for Example 24, therefore, as follows:
Substrate: cellulose-based nonwoven fabric (15 μm)
Inorganic Solid Particle: $Li_{1.5}Al_{0.5}Ti_{1.5}(PO_4)_3$ (mass ratio: 88)
Polymeric Material: polyvinyl formal (mass ratio: 12)

TABLE 36

| | Production Conditions of Negative Electrode Mixture Layer | | | |
|---|---|---|---|---|
| | Slurry Drying Temperature (° C.) | Slurry Application Speed (m/min) | Mixture Coating Film Pressing Temperature (° C.) | Mixture Coating Film Pressing Pressure (kN) |
| Example 50 | 120 | 1 | 25 | 5 |
| Example 51 | 120 | 1 | 25 | 5 |
| Example 52 | 120 | 1 | 25 | 5 |
| Example 53 | 120 | 1 | 25 | 5 |
| Example 54 | 140 | 1 | 25 | 5 |

TABLE 36-continued

Production Conditions of Negative Electrode Mixture Layer

| | Slurry Drying Temperature (° C.) | Slurry Application Speed (m/min) | Mixture Coating Film Pressing Temperature (° C.) | Mixture Coating Film Pressing Pressure (kN) |
|---|---|---|---|---|
| Example 55 | 120 | 0.5 | 25 | 5 |
| Example 56 | 120 | 1 | 130 | 5 |
| Example 57 | 120 | 1 | 25 | 10 |

*Negative Electrode Mixture Compositions for Examples 50-57 were the same as that for Example 21, therefore as follows:
Negative Electrode Active Material: $Li_4Ti_5O_{12}$ (mass ratio: 100)
Electro-conductive Agent: graphite powder (mass ratio: 5)
Binder: PVdF (mass ratio: 1)

TABLE 37

| | σ1 (N/cm) | σ2 (N/cm) | Proportion Taken-up by Region Exhibiting Diminishment of 100% or More With Respect to the Average Peel Strength in SAICAS Profile (%) | Coefficient of Air Permeability of Conjugate (m²) |
|---|---|---|---|---|
| Example 50 | 5 | 0.7 | 0 | $1 \times 10^{-17}$ |
| Example 51 | 6 | 0.7 | 5 | $3 \times 10^{-17}$ |
| Example 52 | 5 | 0.7 | 9 | $8 \times 10^{-17}$ |
| Example 53 | 5 | 0.7 | 9 | $5 \times 10^{-17}$ |
| Example 54 | 6 | 0.7 | 4 | $1.5 \times 10^{-17}$ |
| Example 55 | 5 | 0.8 | 1 | $1.5 \times 10^{-17}$ |
| Example 56 | 5 | 0.7 | 1 | $8 \times 10^{-18}$ |
| Example 57 | 5 | 0.7 | 0 | $9 \times 10^{-18}$ |

*Production Conditions of Electrode Construct for Examples 50-57 were the same as that for Example 1, therefore as follows:
Procedures for Producing Electrode Construct: Procedure E1 described in Table 5
Pressing Temperature: 25° C.
Pressing Pressure: 5 kN <Production of Secondary Battery and Performance Evaluation>

Secondary batteries were produced according to procedures similar to that in Example 1 except that the obtained electrode constructs were used instead of the electrode construct obtained in Example 1.

According to a procedure similar to that in Examples 1 to 5, the charge-discharge efficiency of each secondary battery was measured, and the storage performance was evaluated. The results thereof are shown in Table 38. Table 38 shows the evaluation results corresponding to the evaluated performances shown in Table 13 for Examples 1 to 5.

TABLE 38

| | Charge-discharge Efficiency (%) | Discharge Capacity (mAh/g) | Storage Performance (%) |
|---|---|---|---|
| Example 50 | 85 | 146 | 61 |
| Example 51 | 79 | 162 | 62 |
| Example 52 | 79 | 162 | 58 |
| Example 53 | 82 | 159 | 61 |
| Example 54 | 88 | 162 | 63 |
| Example 55 | 85 | 155 | 65 |
| Example 56 | 79 | 141 | 62 |
| Example 57 | 85 | 159 | 62 |

According to at least one embodiment and example described above, provided is an electrode construct including an electrode and a composite membrane. The electrode includes an active material-containing layer and a current collecting layer. The active material-containing layer includes a first principal surface and a second principal surface present at a reverse side from the first principal surface. The composite membrane includes a composite layer. The composite layer contains inorganic solid particles and a polymeric material. The composite layer is in contact with the first principal surface of the active material-containing layer. In the above electrode construct, a peel strength σ1 at a first interface between the active material-containing layer and the composite layer and a peel strength σ2 at a second interface between the active material-containing layer and the current collecting layer satisfy a relationship of σ1>σ2, while satisfying σ2≤1 N/cm. According to the above configuration, there can be provided an electrode construct and electrode group that can realize a secondary battery that exhibits high charge-discharge efficiency and also having suppressed self-discharge, a secondary battery and battery pack exhibiting high charge-discharge efficiency and also having suppressed self-discharge, and a vehicle and stationary power supply equipped with the battery pack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electrode construct, comprising:
an electrode comprising an active material-containing layer and a current collecting layer, the active material-containing layer comprising a first principal surface and a second principal surface on a reverse side to the first principal surface, and the current collecting layer being in contact with the second principal surface of the active material-containing layer; and
a composite membrane comprising a composite layer, the composite layer comprising inorganic solid particles and a polymeric material, and the composite layer being in contact with the first principal surface of the active material-containing layer,
a peel strength σ1 at a first interface between the active material-containing layer and the composite layer, and a peel strength σ2 at a second interface between the active material-containing layer and the current collecting layer satisfying a relationship of σ1>σ2, the peel strength σ1 satisfying σ1≥1.5 N/cm, and the peel strength σ2 satisfying σ2≤1 N/cm.

2. The electrode construct according to claim 1, wherein the peel strength σ1 exhibits diminishment of 100% or more at 10% or less per 1 mm length along the first interface.

3. The electrode construct according to claim 1, wherein a conjugate of the composite membrane and the active material-containing layer has a coefficient of air permeability of $1 \times 10^{-15}$ m$^2$ or less.

4. The electrode construct according to claim 1, wherein the peel strength σ1 and the peel strength σ2 satisfy a relationship of σ1>10×σ2.

5. The electrode construct according to claim 1, wherein the composite membrane further comprises a substrate layer, the substrate layer comprises a nonwoven fabric or a self-supporting porous film, and the substrate layer is in contact with the composite layer.

6. The electrode construct according to claim 1, wherein the inorganic solid particles comprise solid electrolyte particles having ion conductivity of alkali metal ions.

7. The electrode construct according to claim 1, wherein the inorganic solid particles comprise at least one selected from the group consisting of a compound represented by $Li_{1+w}Al_wTi_{2-w}(PO_4)_3$ where 0.1≤w≤0.5, a compound represented by $Li_{1+y}Al_zM1_{2-z}(PO_4)_3$ where M1 is one or more selected from the group consisting of Ti, Ge, Sr, Zr, Sn, and Ca, 0≤y≤1, and 0≤z≤1, and a compound represented by $Li_{5+x}La_3M2_{2-x}Zr_xO_{12}$ where M2 is one or more selected from the group consisting of Nb and Ta, and 0≤x≤2.

8. The electrode construct according to claim 1, wherein the polymeric material comprises a monomer unit composed of a hydrocarbon having a functional group containing one or more selected from the group consisting of oxygen (O), sulfur (S), nitrogen (N), and fluorine (F), and a proportion in the polymeric material occupied by the monomer unit is 70 mol % or more.

9. The electrode construct according to claim 8, wherein the functional group of the monomer unit comprises one or more selected from the group consisting of a formal group, a butyral group, a carboxymethyl ester group, an acetyl group, a carbonyl group, a hydroxyl group, and a fluoro group.

10. The electrode construct according to claim 1, wherein the active material-containing layer comprises a first electrode active material, the first electrode active material comprising a compound having a lithium ion insertion-extraction potential of 1 V to 3 V (vs. Li/Li$^+$) with respect to the oxidation-reduction potential of lithium.

11. An electrode group comprising:
the electrode construct according to claim 1; and
a counter electrode with respect to the electrode.

12. The electrode group according to claim 11, wherein the counter electrode comprises a second electrode active material, the second electrode active material comprising a compound having a lithium ion insertion-extraction potential of 2.5 V to 5.5 V (vs. Li/Li$^+$) with respect to the oxidation-reduction potential of lithium.

13. A secondary battery comprising:
the electrode group according to claim 11; and
an aqueous electrolyte comprising water.

14. A battery pack comprising the secondary battery according to claim 13.

15. The battery pack according to claim 14, further comprising:
an external power distribution terminal; and
a protective circuit.

16. The battery pack according to claim 14, which comprises plural of the secondary battery, wherein the plural of the secondary battery are electrically connected in series, in parallel, or in combination of series and parallel.

17. A vehicle comprising the battery pack according to claim 14.

18. The vehicle according to claim 17, which comprises a mechanism configured to convert kinetic energy of the vehicle into regenerative energy.

19. A stationary power supply comprising the battery pack according to claim 14.

\* \* \* \* \*